United States Patent

Kosumi et al.

[11] Patent Number: 5,975,269
[45] Date of Patent: Nov. 2, 1999

[54] MULTI-PLATE DRY CLUTCH HAVING HUB MOVEMENT LIMITING MEANS

[75] Inventors: Toshiya Kosumi, Kadoma; Yoshinobu Fukuda, Higashiosaka, both of Japan

[73] Assignee: Exedy Corporation, Neyagawa, Japan

[21] Appl. No.: 09/104,434

[22] Filed: Jun. 25, 1998

Related U.S. Application Data

[62] Division of application No. 08/820,462, Mar. 17, 1997.

[30] Foreign Application Priority Data

| Mar. 19, 1996 | [JP] | Japan | ................................... 8-062585 |
| Mar. 19, 1996 | [JP] | Japan | ................................... 8-062586 |
| Mar. 19, 1996 | [JP] | Japan | ................................... 8-062587 |
| Mar. 27, 1996 | [JP] | Japan | ................................... 8-071741 |
| May 29, 1996 | [JP] | Japan | ................................... 8-135516 |

[51] Int. Cl.⁶ .................................................. F16D 13/50
[52] U.S. Cl. ................................. 192/70.27; 192/109 R
[58] Field of Search ........................... 192/70.11, 70.12, 192/70.19, 70.2, 109 R, 113.2, 70.27, 70.21

[56] References Cited

U.S. PATENT DOCUMENTS

| 5,127,499 | 7/1992 | Beccaris et al. ..................... 192/70.27 |
| 5,181,594 | 1/1993 | Nash .................................... 192/70.27 |
| 5,284,232 | 2/1994 | Prud'Homme ....................... 192/70.21 |
| 5,301,779 | 4/1994 | Nash ........................................ 192/70.2 |
| 5,505,286 | 4/1996 | Nash ............................... 192/70.27 X |
| 5,638,932 | 6/1997 | Mizukami ........................ 192/113.2 X |
| 5,743,367 | 4/1998 | Hofmann et al. ....................... 192/70.2 |
| 5,779,018 | 7/1998 | Hofmann et al. ................ 192/70.27 X |

*Primary Examiner*—Charles A. Marmor
*Assistant Examiner*—Saul Rodriguez
*Attorney, Agent, or Firm*—Shinjyu An Intellectual Property Firm

[57] ABSTRACT

The invention relates to a multi-plate clutch mechanism that includes a pressure plate mechanism is fixed to a first cylindrical portion with first and second friction plates disposed between the pressure plate mechanism and a flywheel connected to the first cylindrical portion. The pressure plate mechanism includes a clutch covbr supported on the first cylindrical portion. The first friction plates contact the first cylindrical portion for rotation therewith and the second friction plates contact a hub flange for rotation therewith. At least one of the second friction plates is formed with a radially inwardly extending protrusion that contacts a corresponding recess formed in the hub flange thus restricting axial movement of the hub flange.

2 Claims, 17 Drawing Sheets

MULTI-PLATE DRY CLUTCH HAVING HUB MOVEMENT LIMITING MEANS

The following application is a division of U.S. Ser. No. 08/820,462, filed Mar. 17, 1997.

BACKGROUND OF THE INVENTION

1. Field of the Invention

The present invention relates to a multi-plate clutch, and more particularly to a multi-plate clutch having a hub member which engages an input shaft of a transmission, where the hub member is axially displaceable and axial displacement of the hub member is limited by the configuration of the multi-plate clutch.

2. Description of the Related Art

In general, a multi-plate clutch used in a racing car or the like is provided with a first cylindrical portion that is configured to be attached to a flywheel. Within the first cylindrical portion, a hub flange is disposed, the hub flange being connected to an input shaft of a transmission. At an outer radial portion of the hub flange, the hub flange is formed with a second cylindrical portion disposed radially inwardly of the first cylindrical portion. Drive plates and driven plates are disposed between the first and second cylindrical portions and directly engage each, respectively. A pressure plate mechanism is attached to the first cylindrical portion for selectively engaging and disengaging the drive plates and driven plates from rotation with the flywheel. The pressure plate mechanism includes a pressure plate and a diaphragm spring for biasing the pressure plate.

The hub flange has gear teeth formed on an outer circumferential surface of the second cylindrical portion and spline grooves formed on an inner circumferential portion. The outer circumferential gear teeth engage corresponding teeth formed on the driven plates, and the inner circumferential spline grooves engage spline teeth formed on the input shaft of the transmission.

The hub and the driven plates both may undergo movement in the axial direction when the clutch is in a clutch disengaged state in order to prevent drag between relatively rotating parts in clutch mechanism, such as the driven plates and the drive plates. However, in the absence of some kind of movement restriction, the hub would come loose from the splines on the input shaft if it moves too far in the axial direction. It is therefore necessary to provide some structure which limits the axial movement of the hub. One such known structure includes roll pins that are mounted on the outer circumferential spline of the hub flange and which extend in a tangential or radial direction. A portion, exposed in the gear teeth, of each roll pin estends between adjacent two teeth of the driven plates in the axial direction. The axial movement of the driven plates and the drive plates are limited by the flywheel and the pressure plate. The hub flange is engaged in the axial direction through the above-mentioned roll pin with the driven plates whose movement range is thus limited so that the axial position of the hub flange is limited within a predetermined range.

In the above-described configuration, since the roll pins are provided only at a couple of predetermined locations, the pressure against the driven plates in the area of contact therebetween is significant enough so that a frictional wear due to contact is likely to occur in the driven plates.

As well, when the torque is transmitted through the drive plates and the driven plates, slippage between the plates generates heat. The service life of the plates and other engagin parts is reduced by the heat. In order to cool the plates, in a conventional manner, slits or holes are formed in the first and second cylindrical portions. Air is caused to flow from the inner circumferential side to the outer circumferential side of both plates to thereby cool both plates.

However, the entrainment of the air from the outside of the clutch is limited. Air usually can only enter via the slit portions of the diaphragm spring. These slits are insufficient to permit the flow of air from the outside.

It is well known in the prior art to use two diaphragm springs in an overlap manner. In this case, when the two diaphragm springs are flexed, a friction is generated therebetween. This means that the flex-load characteristics have an increased hysteresis load due to the friction. As a result, an efficiency is degraded. Therefore, in order to enhance the lubricant effect between the diaphragm springs, a solid lubricant film is formed one of the contacting surfaces. However, since only one surface of each of the two diaphragm springs is subjected to a lubricant treatment, it is necessary to confirm which surface has the film prior to assembly. This requires an additional step in the assembly process, specifically the step of inspecting the surfaces of the two diaphragm spring to see which face has the film thereon.

SUMMARY OF THE INVENTION

One object of the present invention is to reduce friction wear of various contacting members of a clutch mechanism.

Another object of the present invention is to enhance the operatability of a clutch in the engaging and disengaging process.

Another object of the present invention is to increase flow of air passing through a clutch mechanism and in particular through portions of a diaphragm spring to thereby enhance the cooling of the clutch.

Another object of the present invention is to enhance the use and construction of diaphragm springs used in an overlapping manner.

In accordance with one aspect of the present invention, a multi-plate clutch mechanism, includes a first cylindrical portion configured for connection to a flywheel and a hub flange having a second cylindrical portion disposed concentrically within the first cylindrical portion, the hub flange configured to non-rotatably engage an input shaft of a transmission and to axially slide with respect to the input shaft. A plurality of first friction plates are disposed between the first cylindrical portion and the second cylindrical portion, the first friction plates being circumferentially engaged for rotation with the first cylindrical portion but relatively slidable in the axial direction with respect to the first cylindrical portion. A plurality of second friction plates are disposed alternatingly adjacent to the first friction plates in the axial direction, one of the second friction plates being engaged with the second cylindrical portion for rotation therewith but configured for limited relative axial movement with respect to the second cylindrical portion. A pressure plate mechanism is fixed to the first cylindrical portion such that the friction plates are disposed between the pressure plate mechanism and the flywheel. A plate member is fixed to the hub flange, the plate member confining the one of the second friction plates between the plate member and the hub flange limiting axial movement of the hub flange between the pressure plate and the flywheel.

Preferably, the one of the second friction plates has a radially inwardly protruding portion extending between the plate member and the second cylindrical portion.

Preferably, one outer circumferential surface of the second cylindrical portion is formed with a plurality of first tooth portions extending in the axial direction, the second friction plates have, on their inner circumferential portion, a plurality of second tooth portions engaged relatively unrotatable with the first tooth portions of the second cylindrical portion but relatively movable in the axial direction thereto, and the radially inwardly protruding portion extends radially inwardly of the second tooth portions.

Preferably, a slot is formed in the second cylindrical portion which engages the radially inwardly protruding portion.

Preferably, a plurality of the radially inwardly protruding portions are formed in the circumferential direction on the one of the second friction plates and the second cylindrical portion is formed with a plurality of corresponding slots.

In accordance with a second aspect of the present invention, a multi-plate clutch mechanism includes a first cylindrical portion configured for connection to a flywheel and a hub flange having a second cylindrical portion disposed concentrically within the first cylindrical portion, the hub flange configured to non-rotatably engage an input shaft of a transmission and to axially slide with respect to the input shaft. A plurality of first friction plates are disposed between the first cylindrical portion and the second cylindrical portion, the first friction plates being circumferentially engaged for rotation with the first cylindrical portion but relatively slidable in the axial direction with respect to the first cylindrical portion. A plurality of second friction pllzes are disposed alternatingly adjacent to the first friction plates in the axial direction, the second friction plates being configured to engage the second cylindrical portion for rotation therewith but configured for limited relative axial movement with respect to the second cylindrical portion, a first one of the second friction plates being configured to engage a first axial side of the second cylindrical portion and a second one of the second friction plates being configured to engage a second axial side of the second cylindrical portion, the first and second ones of the second friction plates thereby limiting axial movement of the hub flange. A pressure plate mechanism is fixed to the first cylindrical portion such that the friction plates are disposed between the pressure plate mechanism and the flywheel.

Preferably, the first and second ones of the second friction plates are each formed with at least one radially inwardly protruding portion for engagement with the first and second axial sides of the second cylindrical portion, respectively.

Preferably, a plurality of the radially inwardly protruding portions are formed on the first and second ones of the second friction plates.

Preferably, the second cylindrical portion is formed with grooves on the first and second axial sides thereof corresponding to the radially inwardly protruding portions for receiving the radially inwardly protruding portions.

In accordance with a third aspect of the present invention, a multi-plate clutch mechanism includes a first cylindrical portion configured for connection to a flywheel and a hub flange having a second cylindrical portion disposed concentrically within the first cylindrical portion, the hub flange configured to non-rotatably engage an input shaft of a transmission. A plurality of first friction plates are disposed between the first cylindrical portion and the second cylindrical portion, the first friction plates being circumferentially engaged for rotation with the first cylindrical portion but relatively slidable in the axial direction with respect to the first cylindrical portion. A plurality of second friction plates are disposed alternatingly adjacent to the first friction plates in the axial direction, the second friction plates being configured to engage the second cylindrical portion for rotation therewith but configured for limited relative axial movement with respect to the second cylindrical portion. A pressure plate mechanism is fixed to the first cylindrical portion such that the friction plates are disposed between the pressure plate mechanism and the flywheel, the pressure plate mechanism including a clutch cover supported on the first cylindrical portion, a pressure plate disposed between the clutch cover and the first and second friction plates and a diapragm spring disposed between the clutch cover and the pressure plate. A resilient member is disposed between the flywheel and the pressure plate mechanism, the resilient member operably configured to flex and be elastically deformed in the axial direction in response to movement of the diaphragm spring.

Preferably, the resilient member is disposed between the pressure plate and the diaphragm spring.

Preferably, the resilient member is disposed in an annular recess formed in the flywheel adjacent to one of the first and second friction plates.

Preferably, the multi-plate clutch mechanism further includes a piston plate disposed in the annular recess formed in the flywheel, the piston plate positioned between the resilient member and the one of the first and second friction plates.

In accordance with a fourth aspect of the present invention, a diaphragm spring for a clutch mechanism includes an annular resilient portion having a plurality of lever portions extending radially inwardly therefrom, each of the lever portions having a body portion and a contact portion, the contact portion being radially inward from the body portion, each adjacent pair of the body portions defining an oblong hole therebetween and each adjacent pair of the contact portions defining a slit therebetween, each of the oblong holes having a circumferential width greater than a circumferential width of the slits and each of the oblong holes having a radial length greater than a radial length of the slits, such that the oblong holes provide a means for supporting the annular resilient portion within a clutch mechanism and the oblong holes also allow for flow of air into the clutch mechanism.

Preferably, a contact radius is defined on the contact portions, the contact radius defining a general location for engagement with a clutch release mechanism, and the contact portions are located within a range of no more than approximately 5 mm radially inwardly from the contact radius.

Preferably, the radial length of the body portions is approximately two-thirds of the radial length of the contact portions.

In accordance with a fifth aspect of the present invention, a clutch mechanism includes a clutch cover configured for connection to a flywheel, a pressure plate disposed adjacent to the clutch cover and a diaphragm spring supported on the clutch cover for biasing the pressure plate toward the flywheel. The diaphragm spring includes an annular resilient portion having a plurality of lever portions extending radially inwardly therefrom, each of the lever portions having a body portion and a contact portion, the contact portion being radially inward from the body portion, each adjacent pair of the body portions defining an oblong hole therebetween and each adjacent pair of the contact portions defining a slit therebetween, each of the oblong holes having a circumferential width greater than a circumferential width of the slits and each of the oblong holes having a radial length greater than a radial length of the slits, such that the oblong holes provide a means for supporting the annular resilient portion within the clutch cover and the oblong holes also allow for flow of air into the clutch cover.

Preferably, a contact radius is defined on the contact portions, the contact radius defining a general location for engagement with a clutch release mechanism, and the contact portions are located within a range of no more than approximately 5 mm radially inwardly from the contact radius.

Preferably, the radial length of the body portions is approximately two-thirds of the radial length of the contact portions.

In accordance with a sixth aspect of the present invention, a clutch biasing mechanism includes a first diaphragm spring having a first resilient annular portion and a plurality of first lever portions extending radially inwardly from the first resilient annular portion and having both surfaces on which solid lubricant films are formed. A second diaphragm spring has a second resilient annular portion and a plurality of second lever portions extending radially inwardly from the second resilient annular portion and having both surfaces on which solid lubricant films are formed, the second diaphragm spring being overlapped on the first diaphragm spring.

In accordance with a seventh aspect of the present invention, a clutch cover mechanism includes a clutch cover configured for connection to a flywheel, a pressure plate disposed adjacent to the clutch cover and a biasing means disposed between the clutch cover and the pressure plate. The biasing means includes a first diaphragm spring having a first resilient annular portion and a plurality of first lever portions extending radially inwardly from the first resilient annular portion and having both surfaces on which solid lubricant films are formed. A second diaphragm spring has a second resilient annular portion and a plurality of second lever portions extending radially inwardly from the second resilient annular portion and having both surfaces on which solid lubricant films are formed, the second diaphragm spring being overlapped on the first diaphragm spring.

In accordance with an eigth aspect of the present invention, a multi-plate clutch mechanism includes a first cylindrical portion configured for connection to a flywheel and a hub flange having a second cylindrical portion disposed concentrically within the first cylindrical portion, the hub flange configured to non-rotatably engage an input shaft of a transmission. A plurality of first friction plates are disposed between the first cylindrical portion and the second cylindrical portion, the first friction plates being circumferentially engaged for rotation with the first cylindrical portion but relatively slidable in the axial direction with respect to the first cylindrical portion. A plurality of second friction plates are disposed alternatingly adjacent to the first friction plates in the axial direction, the second friction plates being circumferentially engaged for rotation with the second cylindrical portion but relatively slidable in the axial direction with respect to the second cylindrical portion. A clutch cover is fixed to the first cylindrical portion such that the friction plates are disposed between the clutch cover and the flywheel. A pressure plate is disposed adjacent to the clutch cover and a biasing means is disposed between the clutch cover and the pressure plate. The biasing means includes: a first diaphragm spring having a first resilient annular portion and a plurality of first lever portions extending radially inwardly from the first resilient annular portion and having both surfaces on which solid lubricant films are formed; and a second diaphragm spring having a second resilient annular portion and a plurality of second lever portions extending radially inwardly from the second resilient annular portion and having both surfaces on which solid lubricant films are formed, the second diaphragm spring being overlapped on the first diaphragm spring.

DETAILED DESCRIPTION OF THE PREFERRED EMBODIMENT

FIRST EMBODIMENT

Figure 1:
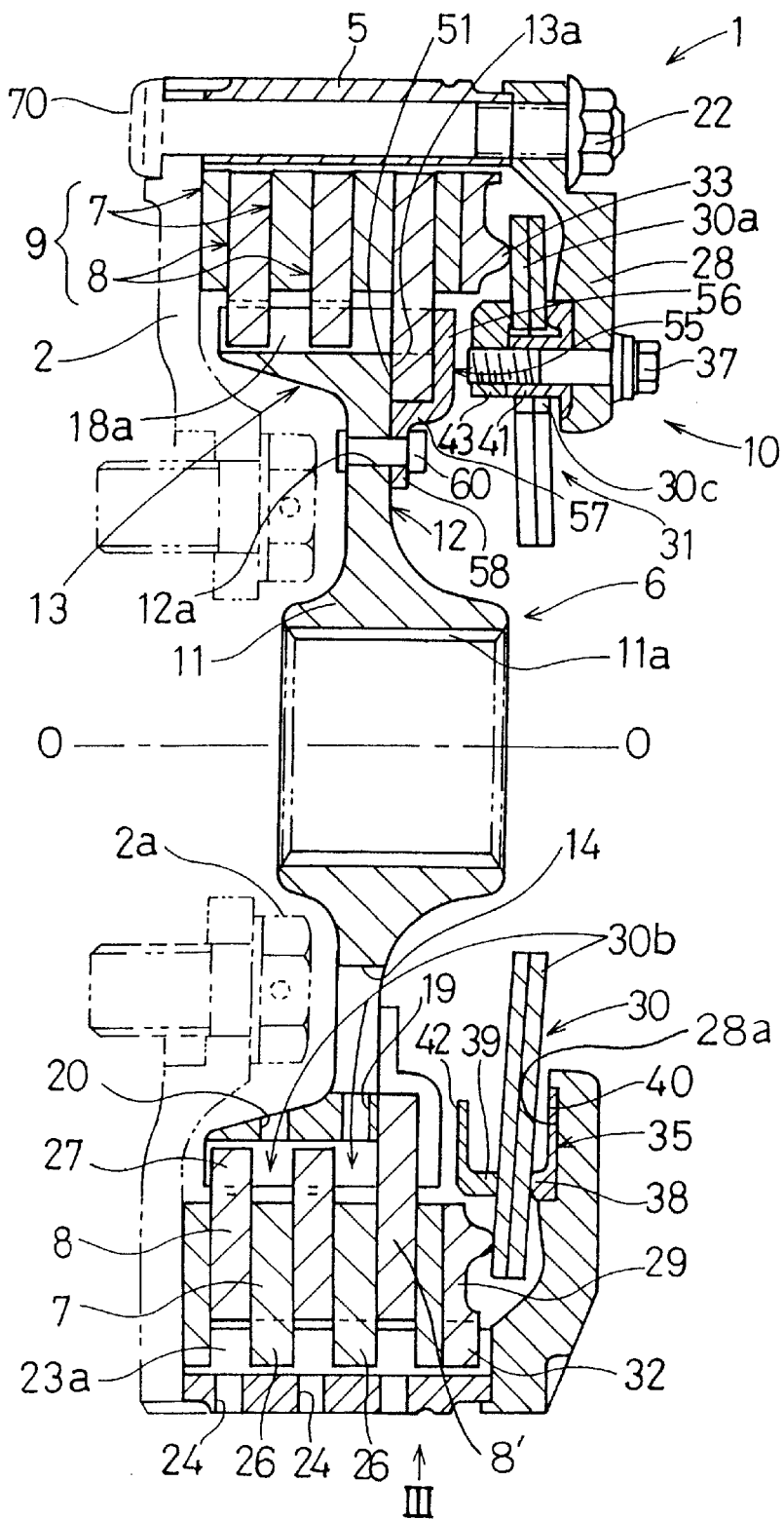
FIG. 1 is a cross-sectional view showing an automotive dry type multi-plate clutch in accordance with a first embodiment of the present invention.

FIG. 1 is a cross-sectional view showing an automotive dry type multi-plate clutch 1 in accordance with one embodiment of the invention. The line O—O is a rotary axis of the dry type multi-plate clutch 1. For reference, the left hand side of FIG. 1 is hereinafter referred to as the engine side or flywheel side and the right hand side of FIG. 1 is referred to as the transmission side.

The dry type multi-plate clutch 1 is used for transmitting/interrupting a torque to an input shaft (not shown) of a transmission from a flywheel 2 of an engine (not shown). The inner circumferential portion of the flywheel 2 is fixed to a crankshaft (not shown) by bolts 2*a*.

The dry type multi-plate clutch 1 is mainly composed of a flywheel ring 5 (first cylindrical portion), a hub flange 6 as an output member, a frictional plate group 9 composed of a plurality of drive plates 7 and a plurality of driven plate 8 interposed between the flywheel ring 5 and the hub flange 6, and a clutch cover assembly 10 for selectively engaging and dis-engaging plates 7 and 8 from engaging and rotation with one another.

Figure 2:
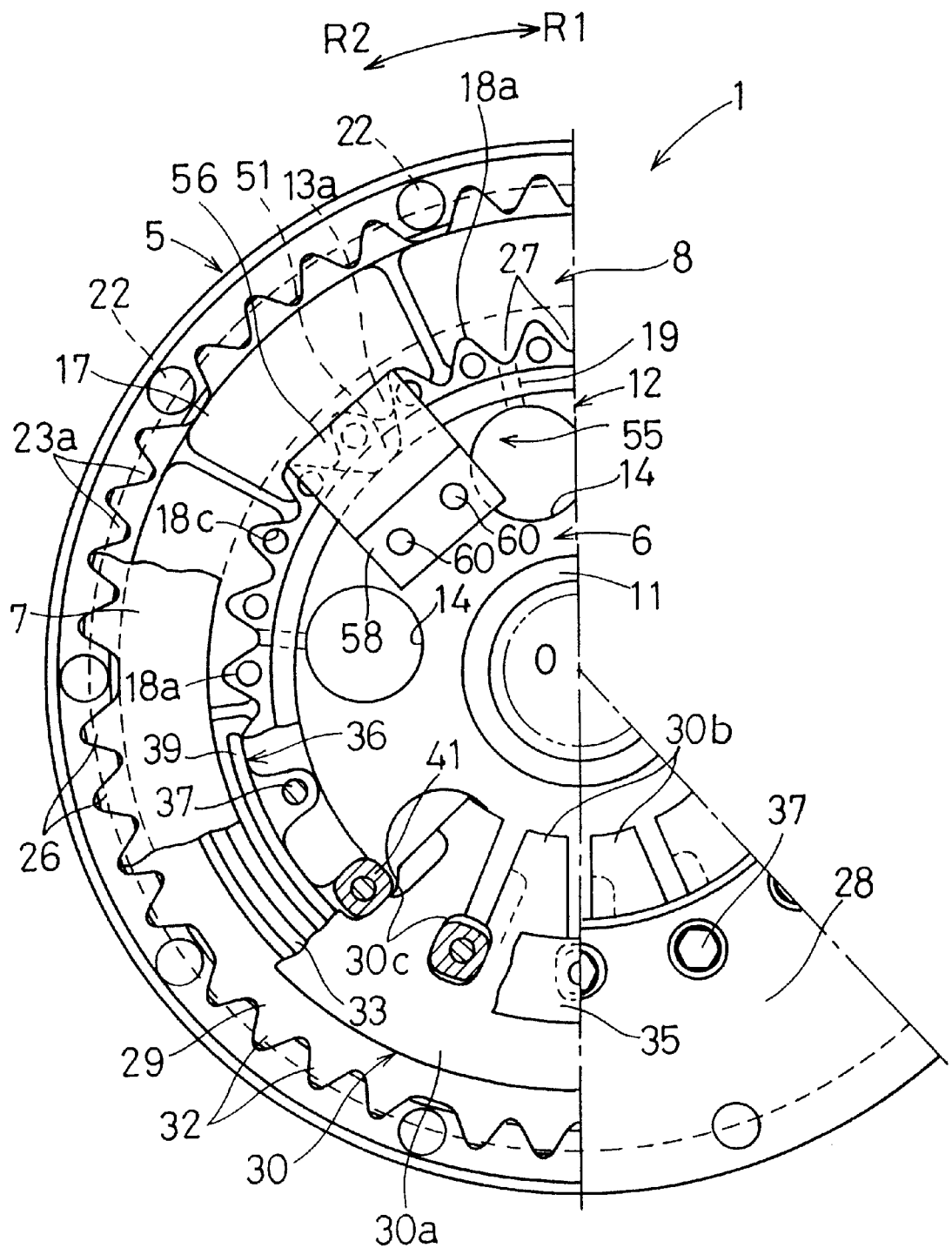
FIG. 2 is a part corss section, part elevation, part cutaway of the dry type multi-plate clutch depicted in FIG. 1, showing various features of the present invention, including a plate member.

The hub flange 6 has a centrally located boss 11, a flange 12 extending radially outwardly, integrally from the boss 11 and a second cylindrical portion 13 integrally formed on an outer circumference of the flange 12. A spline hole 11*a* is formed in the center of the boss 11. The spline hole 11*a* is engaged with spline teeth of the input shaft (not shown) of the transmission (not shown). Thus, the hub flange 6 is not rotatable relative to the input shaft of the transmission but is movable in the axial direction relative to the transmission input shaft. The flange 12 is provided with a plurality of circular air ventilation openings 14 at an interval in the circumferential direction. The second cylindrical portion 13 extends in an axial direction from the flange 12. A number of outer teeth 18*a* (first tooth portion) extending in the axial direction are formed on the outer circumference of the second cylindrical portion 13. As shown in FIG. 2, a hole 18*c* is formed to pass through each outer tooth 18*a* in the axial direction. An air passage hole 19 is formed radially outwardly from each air passage hole 14. A plurality of air passage holes 20 are formed in the second cylindrical portion 13. The air passage holes 19 and 20 extend through the second cylindrical portion 13 substantially radially outwardly, with the radially outward ends thereof open to the bottom portion of an adjacent pair of outer teeth 18*a*.

Slot groove, 13*a* (FIGS. 2 and 5) are formed in a plurality of locations in an end face of the second cylindrical portion 13 on the transmission side. At a radially outer end, each slot 13*a* has a width generally corresponding to the single outer tooth 18, the width gradually decreasing inwardly.

The frictional plate group 9 is arranged between the inside of the flywheel ring 5 and the second cylindrical portion 13 of the hub flange 6. The frictional plate group 9 is axially interposed between the frictional surface of the flywheel 2 and an annular pressure plate 29 (described below).

The frictional plate group 9 is composed of four drive plates 7 and a driven plate 8' and two driven plates 8 arranged alternatively in the axially direction. The drive plates 7 and the driven plates 8 and 8' are dry type carbon-made annular frictional plates and all arranged coaxially with the input shaft of the transmission. The drive plates 7 are provided with radial projections 26 in their outer circumferential portion. The radial projections 26 are engaged non-rotatably with the internal teeth 23*a* of the flywheel ring 5 but are slidable in the axial direction. The driven plates 8 are provided with radial projections 27 (second tooth portion) in their inner circumferential direction. The projections 27 are engaged non-rotatably with the outer teeth 18*a* of the second cylindrical portion 13 but are slidable in the axial direction. The driven plate 8' at the transmission side is formed with contact portions 51 which are engaged relatively unrotatable with the slots 13*a* formed in the second cylindrical portion 13. The contact portions 51 have the same shape as that of the slots 13*a*, are longer in width than the protrusion 27 and extend in radially inwardly.

Figure 5:
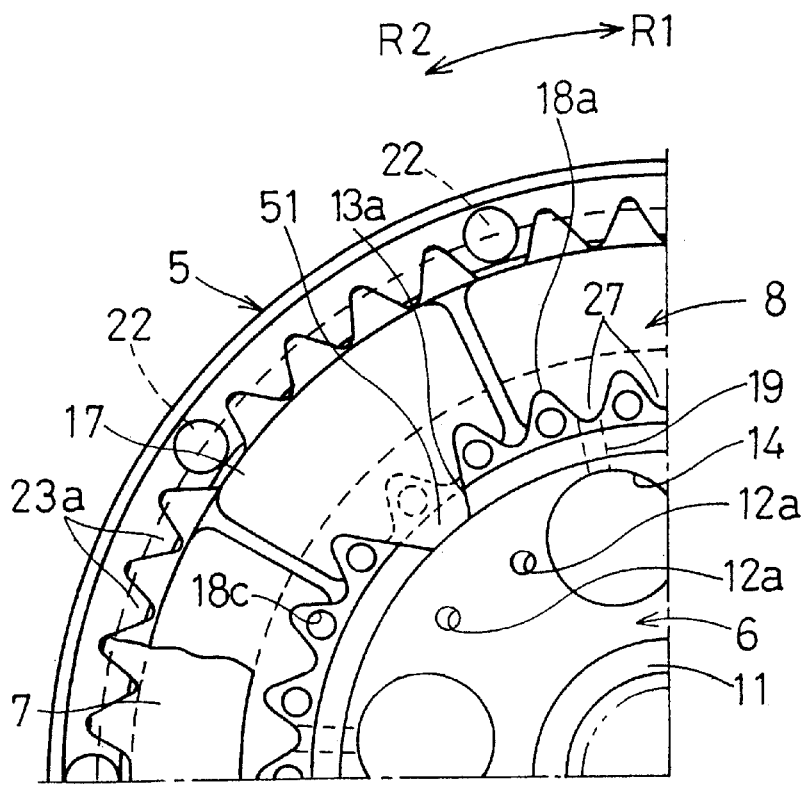
FIG. 5 is a fragmentary, elevational view similar to FIG. 2, showing a hub flange and a driven plate with the plate member removed.
Figure 6:
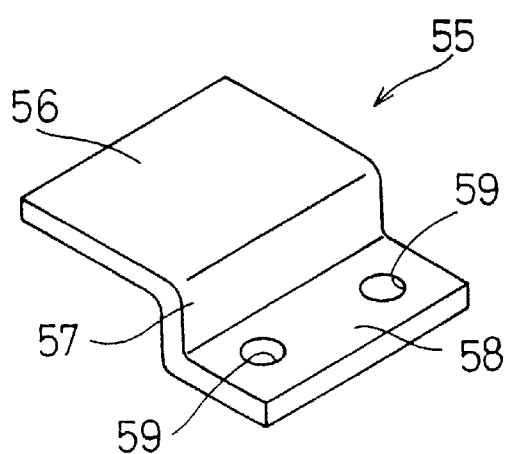
FIG. 6 is a perspective view showing the plate member.

A plurality of plate members 55 are fixed to the outer circumferential portion of the hub flange 6 on the transmission side for limiting the axial movement of the driven plate 8' at the transmission side relative to the hub flange 6. FIGS. 1 and 2 show a state where the plate members 55 are fixed to the flange 12. FIG. 5 shows the hub flange 6 and the driven plate 8 prior to installation of the plate members 55 to the flange 12. FIG. 6 shows one of the plate members 55 before installation.

As is apparent from FIG. 6, each of the plate members 55 has a retainer portion 56, a joint portion 57 extending from one end of the retainer portion 56 in the axial direction, and a fastening portion 58 extending from the joint portion 57. Rivets 60 extend through holes 59 and holes 12*a* formed in the flange 12 for fastening the plate members 55 to the hub flange 6. The retainer portion 56 of each plate member 55 in the fastened condition is arranged on the transmission side of the contact portion 51 of the driven plate 8'. Thus, the driven plate 8' on the transmission side is clamped in the axial direction between the surface (slot 13*a*) of the second cylindrical portion 13 on the transmission side and the retainer portion 56. When the clutch assembly 1 is in a clutch dis-engaged state, the driven plate 8' is movable through a predetermined distance in the axial direction between the flange 12 and the plate member 55. As described above, the hub flange 6 limits the axial relative movement of the single driven plate 8.

The clutch cover assembly 10 is mainly provided with a clutch cover 28, an annular pressure plate 29 arranged within the clutch cover 28, a diaphragm spring 30 for urging the pressure plate 29 toward the flywheel 2, and a support mechanism for supporting the diaphragm spring 30 to the clutch cover 28.

The clutch cover 28 is fixed to an end face of the flywheel ring 5 by the above-described bolts 22. The clutch cover 28 maybe made of metal, for instance, aluminum or an aluminum alloy to reduce its weight.

The pressure plate 29 is provided on its outer circumferential portion with radial projections 32. The projections 32 are engaged non-rotatably with the internal teeth 23*a* but slidable in the axial direction. An annular raised portion 33 having a semicircular shape in cross section is formed integrally with a portion, on the inner circumferential side, of a back surface of the pressure plate 29 (ie., a surface opposite the driven plates 8).

The diaphragm spring 30 is composed of an annular portion 30a and a plurality of lever portions 30b extending radially inwardly from the inner circumference of the annular portion 30a. The lever portions 30b are provided at an equal interval in the circumferential direction. A slit is formed between the adjacent lever portions 30b. A cutaway 30c having a relatively large width in the circumferential direction is formed in a radially outward portion of each slit.

Figure 4:
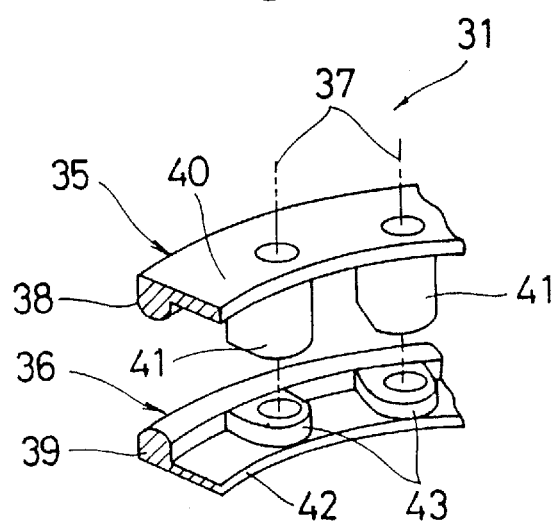
FIG. 4 is a fragmentary, part cross sectional, perspective view showing a support mechanism of the dry type multi-plate clutch.

The support mechanism 31, FIG. 4, includes a pair of first and second support members 35 and 36 for supporting the inner circumferential portion of the annular portion 30a of the diaphragm spring 30, and a plurality of bolts 37 for fastening the two annular support members 35 and 36 to the clutch cover 28. The pair of annular support members 35 and 36 are made of steel. The annular support members 35 and 36 extend in the circumferential direction along the diaphragm spring 30, and each have support portions at their outer circumferential portions. Each of the support portions 38 and 39 has a convex shape such as a semicircular shape or the like in cross section in a portion in contact with the diaphragm spring 30. The support portion 38 of the first annular support member 35 is in contact with the diaphragm spring 30 from the clutch cover 28 side (right side in FIG. 1), and the support portion 39 of the second annular support member 36 is in contact with the diaphragm spring 30 from the hub flange 6 side (left side in FIG. 1). A thin seat portion 40 having an annular shape and extending radially is formed integrally on the inner circumferential side of the support portion 38, as shown in the right side in FIG. 1. A plurality of leg portions 41 extending in the axial direction are formed integrally with the seat portion 40 at an interval in the circumferential direction. Also, a thin annular portion 42 having an annular shape and radially extending, is formed integrally on the inner circumferential side of the support portion 39, as shown on the left side in FIG. 1. A plurality of projections 43 extending in the axial direction are formed integrally at an interval in the circumferential direction. The projections 43 are continuous with the inner circumference of the support portion 39. The leg portions 41 and the projection 43 are projected in a direction close to each other. When assembled, as shown in FIG. 1, the leg portions 41 are engaged with the projections 43 at their front face through the cutaways 30c of the diaphragm spring J0.

An annular groove 28a is formed in the clutch cover 28. A back surface, an inner circumferential surface and an outer circumferential surface of the first annular support member 35 are seated in the annular groove 28a. The annular support member 35 is seated in the annular groove 28a and retained in place by the bolts 37. Bolt insertion holes (provided with no screw threads) through which the bolts 37 extend through each leg portion 41 and a portion of the seat portion 40 continuous with the leg portion 41 in the first annular support member 35. Bolt insertion holes coaxial with these holes are formed also in the clutch cover 28. Threaded screw holes are formed in the projections 43 of the second annular support member 36 and a portion of the annular portion 42 continuous with the projections 43. The screw portions of the bolts 37 are fastened to those screw holes.

As described above, the annular support members 35 and 36 are fixed to the clutch cover 28 by the plurality of bolts 37. The outer circumferential portion of the annular portion 30a of the diaphragm spring 30 supported to these annular support members 35 and 36 are in contact with the raised portion 33 of the pressure plate 29 to thereby urge the pressure plate 29 toward the flywheel 2 (on the left side in FIG. 1).

As described above, the drive plates 7 and the driven plates 8 are clamped in the axial direction between the flywheel 2 and the clutch cover assembly 10 and are limited in the axial movement. With such an arrangement, the hub flange 6 is engaged relatively unmovable in the axial direction with the single driven plate. Accordingly, the axial movement of the hub flange 6 is also limited. Namely, the axial position of the hub flange 6 is determined.

The operation will now be described.

In a clutch engagement state, the release unit (not shown) is not urged against the diaphragm spring 30 and toward the flywheel 2, thereby allowing the elastic or biasing force of the diaphragm spring 30 to push the pressure plate 29 toward the frictional plate group 9. Thus, the drive plates 7 and the driven plates 8 are pressed into contact with each other. It is therefore possible for torque inputted from the flywheel 2 to the flywheel ring 5 to be transmitted through the drive plates 7 and the driven plates 8 and 8' to the hub flange 6 and further outputted from the hub flange 6 to the input shaft of the transmission (not shown).

In order to put the clutch in a clutch dis-engaged state, the release unit (not shown) is forced against the ends of the lever portions 30b of the diaphragm spring 30 toward the flywheel 2, and thus urge the outer circumferential portion of the annular portion 30a of the diaphragm spring 30 in a direction away from the pressure plate 29. The pressure between the drive plates 7 and the driven plates 8 and 8' is released zio interrupt torque transmission.

The axial position of the hub flange 6 is generally determined by the engagement between the single driven plate 8' and the plate members 55. For this reason, drag associated with contact between relatively rotating members such as plates 7 and 8 and 8' upon torque transmission interruption is prevented due to the limited axial movement of the hub flange 6 and the driven plate 8'. Further, because of the movement limiting effects of the plate members 55 and the plate 8', the hub flange 6 may only undergo limited movement and disengagement with the input shaft of the transmission is prevented. Also, since the hub flange 6 and the driven plate 8' are in contact with each other at contact portions 51 which have a relatively large area, the contact therebetween is distributed across a larger area. As a result, overall wear is not localized.

In the multi-plate clutch according to the present invention, the first annular frictional plates and the second annular frictional plates are interposed in the axial direction between the rotational flywheel and the pressure mechanism so that they are limited in the axial movement. Furthermore, the plate members are arranged on the opposite side of the single second cylindrical portion, at the end side in the axial direction, of the second frictional plates so that the output member prevents the output member from moving in the axial direction relative to the second annular frictional plates. Thus, the axial movement of the output member is limited. It should be noted that the contact area is increased by the contact of the retainer portion of the plate member with the contact portion of the second annular frictional plate. As a result, the wear of the second annular frictional plates may be suppressed.

SECOND EMBODIMENT

Figure 7:
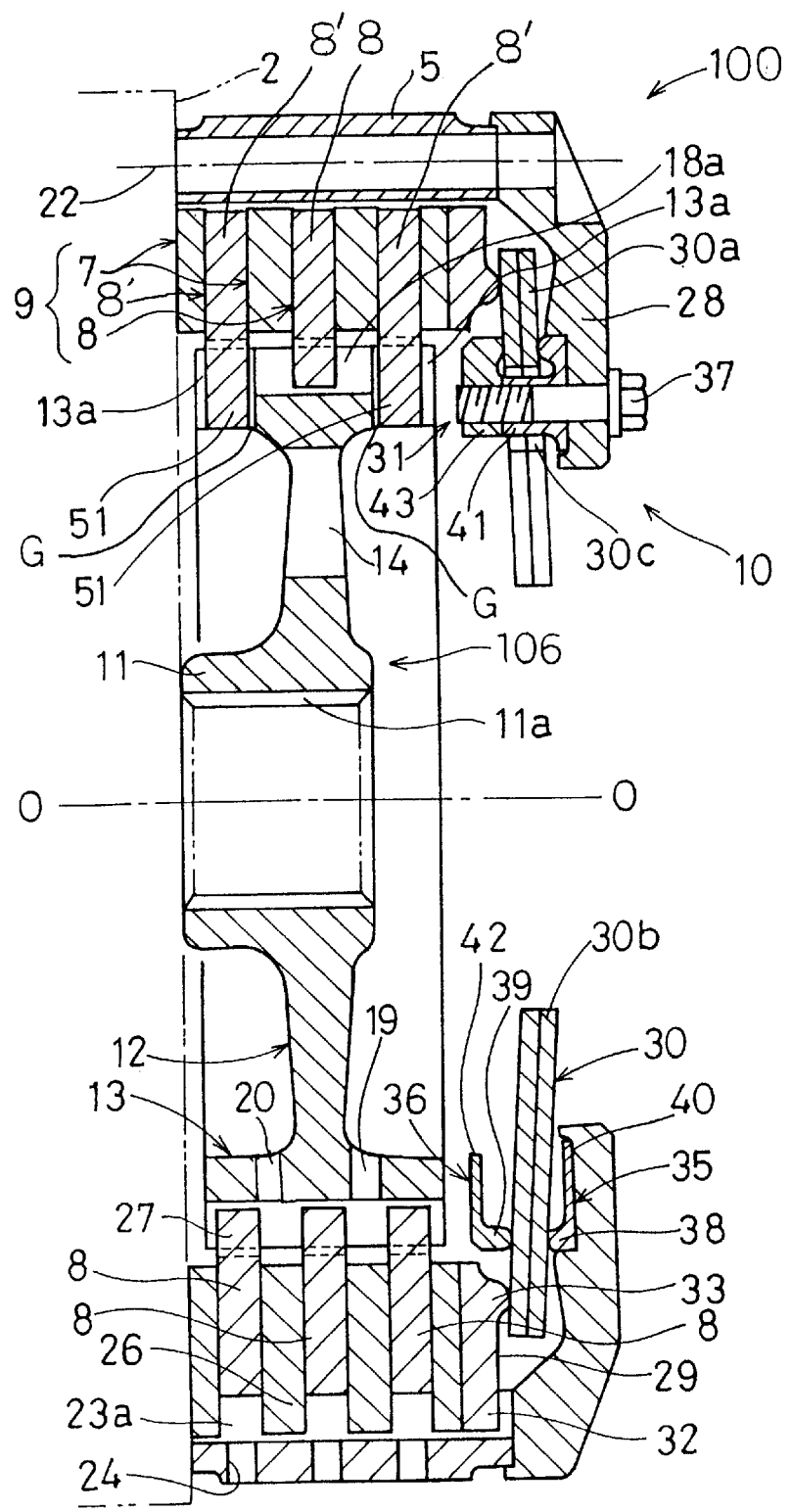
FIG. 7 is a cross-sectional view showing an automotive dry type multi-plate clutch in accordance with a second embodiment of the present invention.

A second embodiment of the present invention will now be described with reference to FIGS. 7 and 8.

Figure 8:
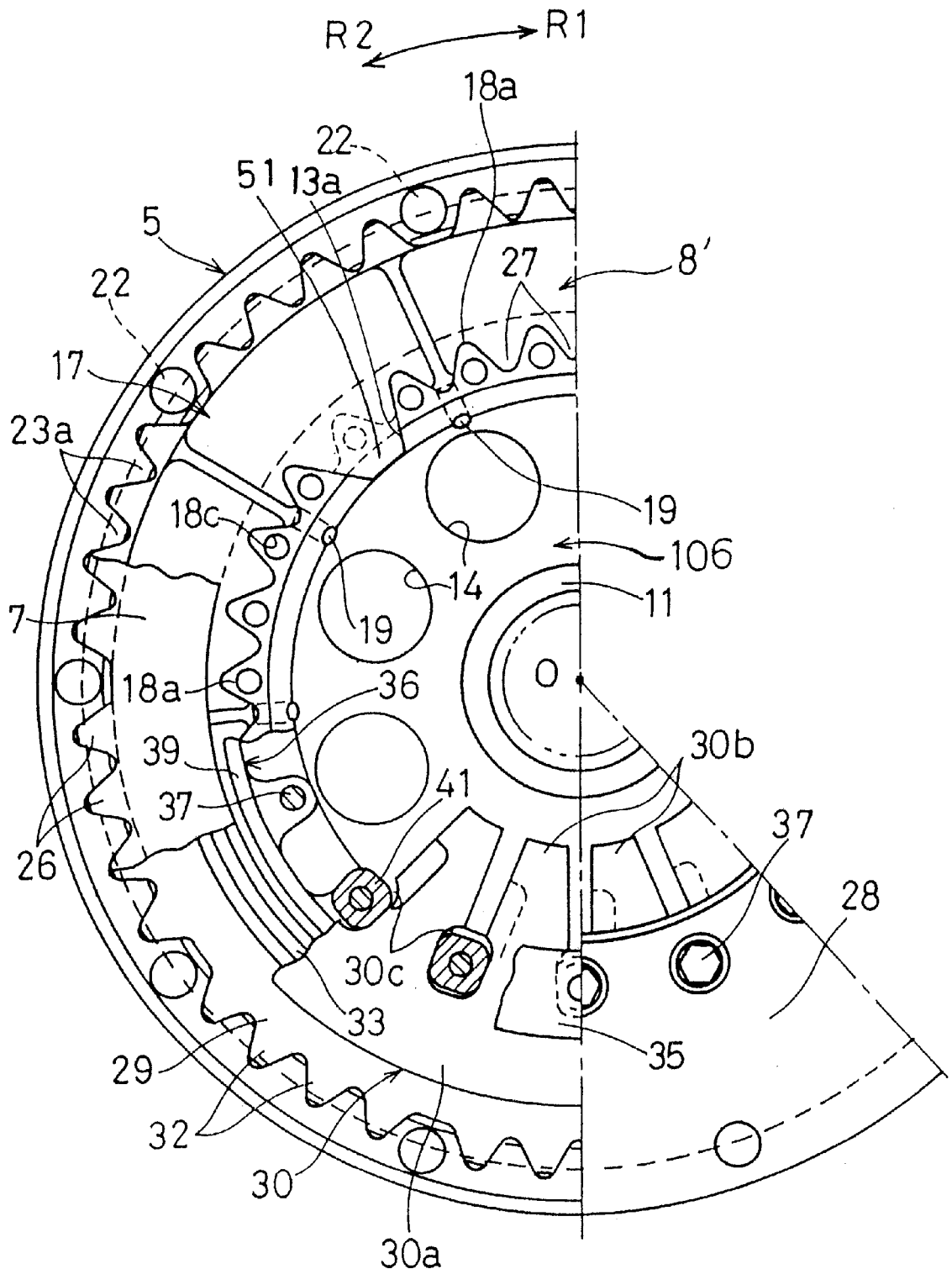
FIG. 8 is a part cross section, part elevation, part cutaway of the dry type multi-plate clutch depicted in FIG. 7, showing various features of the second embodiment of the present invention.

FIG. 8 is a cross-sectional view showing an automotive dry type multi-plate clutch 100 in accordance with a second embodiment of the present invention. Many of the features of the dry type multi-plate clutch 100 are similar or the same as those features described above with respect to the first embodiment. Therefore, some of the description of the common elements and features has been omitted.

In the second embodiment, a hub flange 106 has a centrally located boss 11, a flange 12 expanding radially outwardly, integrally from the boss 11 and a second cylindrical portion 13 integrally formed on an outer circumference of the flange 12. Holes 18c are formed in each outer tooth 18a, each hole 18c extending in the axial direction through each tooth 18a.

A flywheel ring 5 is coaxially arranged radially outwardly of the second cylindrical portion 13. The flywheel ring 5 is fixed to the flywheel 2 of the engine at one end on the left side in FIG. 7 by a plurality of bolts 22 (whose center axis only is shown in FIGS. 7 and 8). The flywheel ring 5 is provided with internal teeth 23a. A plurality of air passage slots 24 are provided at a plurality (for example, three) of locations at an interval in the axial direction on the outer circumference of the flywheel ring 5. As shown in FIG. 7, the air passage slots 24 are provided radially outwardly of the driven plates 8 and 8'. Each air passage slot 24 extends arcuately along the circumferential direction of the flywheel ring 5 with its bottom opening to the bottom surface of the plurality of internal teeth 23a. Due to the fact that the air passage slots 24 extend in the circumferential directions, the weight of the flywheel ring 5 is reduced.

The frictional plate group 9 is arranged between the inside of the flywheel ring 5 and the second cylindrical portion 13 of the hub flange 106.

The frictional plate group 9 is composed of four drive plates 7 and one driven plate 8 and two driven plates 8' arranged alternatively in the axially direction. The drive plates 7 and the driven plates 8 and 8' are dry type carbon-made annular frictional plates and all arranged coaxially with the input shaft of the transmission. The drive plates 7 are provided with radial projections 26 in their outer circumferential portion. In the second embodiment, there are two driven plates 8' each provided with contact portions 51 engaged non-rotatably with grooves 13a formed in the second cylindrical portion 13 but may slide in the axial direction. Since there are grooves 13a formed on each axial end of the second cylindrical portion 13 and two driven plates 8', one driven plate 8' being disposed on each opposing axial end thereof, the second cylindrical portion 13 is restrained against axial movement by the plurality of contact portions 51 of the two driven plates 8'. A gap G is maintained between each end face of the second cylindrical portion 13 and each contact portion 51, as shown in FIG. 7, when the dry type multi-plate clutch 101 is newly manufactured.

The clutch cover 28 is fixed to an end face of the flywheel ring 5 by the above-described bolts 22. The clutch cover 28 is preferably made of aluminum or an aluminum alloy to reduce its weight.

The operation of the second embodiment is similar to that of the first embodiment, described above. However, in the second embodiment depicted in FIGS. 7 and 8, the general position of the hub flange 106 in the axial direction is maintained by the contact portions 51 of the two driven plates 8'. Thus, since the positioning of the hub flange 6 is performed without the addition of extra elements or structure, the number of the parts is reduced.

Also, since the hub flange 106 and the driven plates 8' are in contact with each other through the contact portions 51 having a large contact area, the contact area is increased and the frictional wear is less localized.

In the multi-plate clutch according to the present invention, the first annular frictional plates and the second annular frictional plates are interposed in the axial direction between the rotational flywheel and the pressure mechanism and their axial motion is limited. Furthermore, since the contact portions of both annular frictional plates are contacted against both ends of the second cylindrical portion in the axial direction, the movement of the output member in the axial direction is limited. Since the planar contact portions are brought into contact with the second annular frictional plates, the contact area is increased to thereby suppress wear.

THIRD EMBODIMENT

Figure 9:
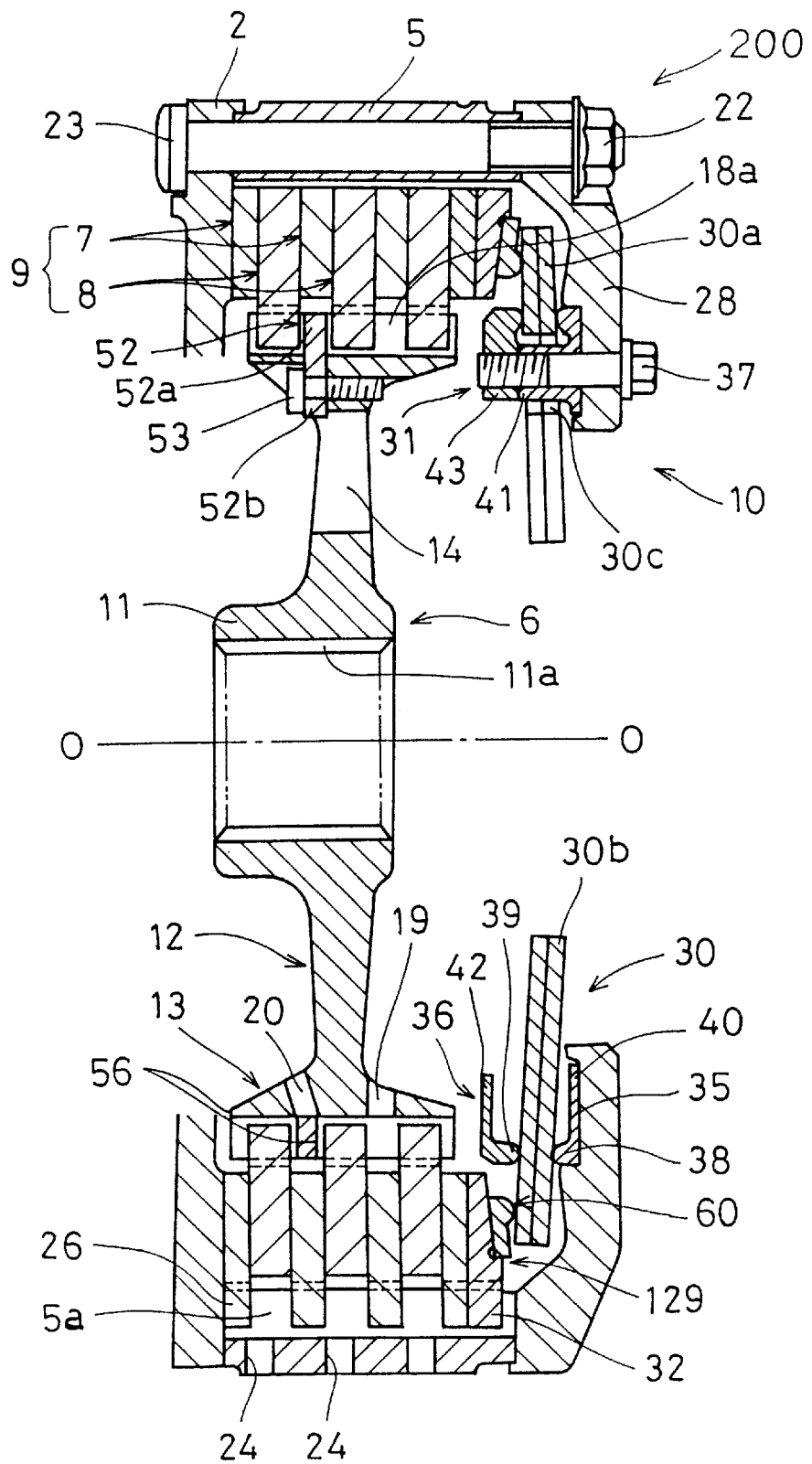
FIG. 9 is a cross-sectional view showing an automotive dry type multi-plate clutch in accordance with a third embodiment of the present invention, having a pressure plate and diaphragm spring which interact with each other via support members on the pressure plate, the support members including a fulcrum ring.
Figure 10:
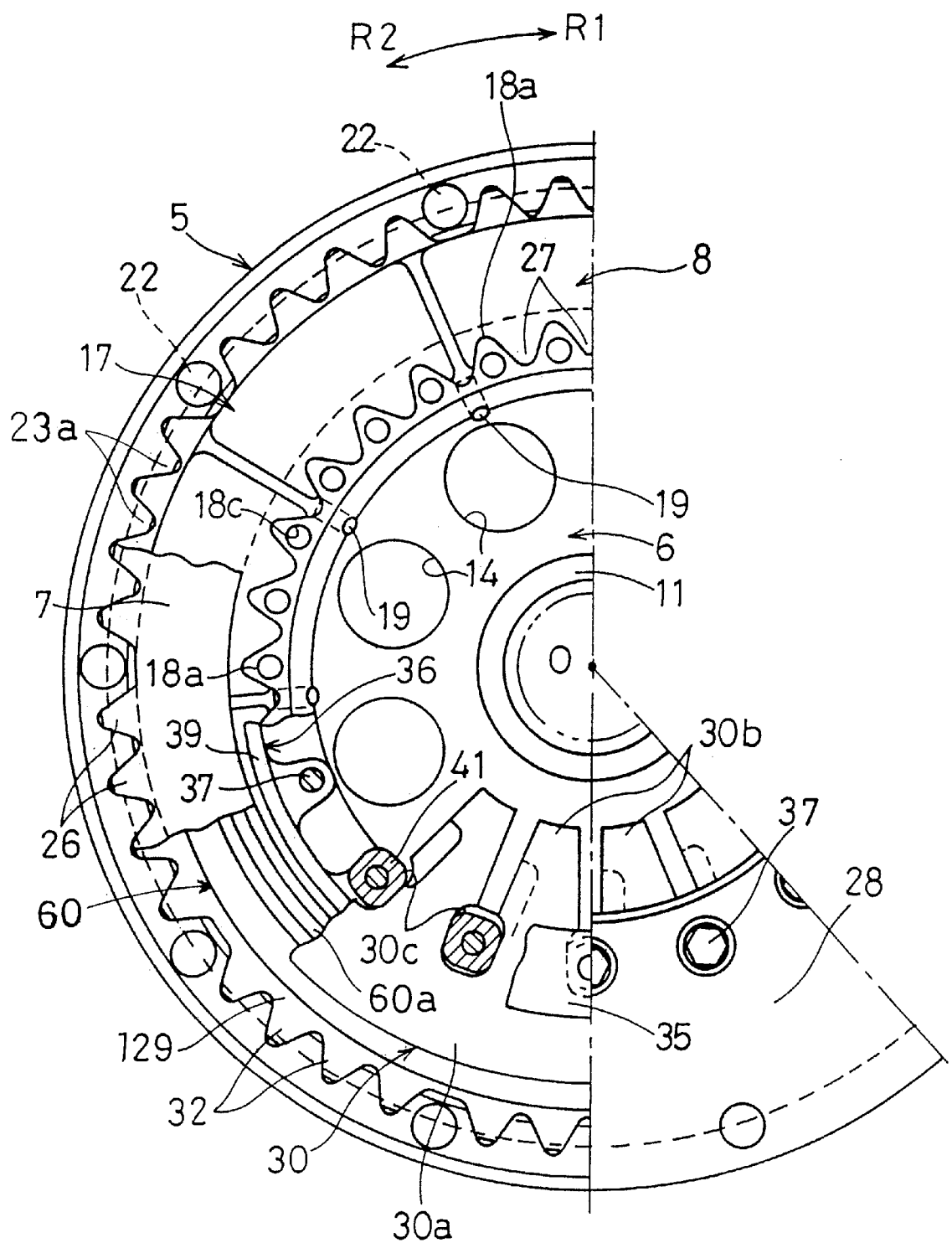
FIG. 10 is a part cross section, part elevation, part cutaway of the dry type multi-plate clutch depicted in FIG. 9, showing various features of the third embodiment of the present invention.

FIG. 9 is a cross-sectional view showing an automotive dry type multi-plate clutch 200 in accordance with a third embodiment of the present invention. The line O—O is a rotary axis of the dry type multi-plate clutch 200.

The dry type multi-plate clutch 200 shown in FIGS. 9, 10, 11 and 12 has many features similar to those described above with respect to the first and second embodiments. Like components have like reference numerals. Description of some similar or identical parts has therefore been omitted.

In the third embodiment, the dry type multi-plate clutch 200 does not include the grooves 13a described above with respect to the first and second embodiments. In the third embodiment, the axial movement of the hub flange 6 is effected differently.

The frictional plate group 9 is composed of four drive plates 7 and three driven plates 8 arranged alternatively in the axially direction. The drive plates 7 and the driven plates 8 are dry type carbon-made annular frictional plates and all arranged coaxially with the input shaft of the transmission.

The clutch cover assembly 10 includes a clutch cover 28, an annular pressure plate 129 arranged within the clutch cover 28, a diaphragm spring 30 for urging the pressure plate 129 toward the flywheel 2, and a support mechanism 31 for supporting the diaphragm spring 30 to the clutch cover 28 side. The clutch cover 28 is fixed to an end face of the flywheel ring 5 by the previously described bolts 22.

The pressure plate 129 is disposed on the right side of FIG. 9 of the drive plate 7 disposed proximate to the clutch cover 28. The pressure plate 129 is provided at its outer circumferential portion with radial projections 32. The projections 32 are non-rotatable relative to internal teeth 5a but slidable in the axial direction. The pressure plate 129 is formed with a taper surface 129a which decreases in height going toward an inner circumferential end thereof.

Figure 11:
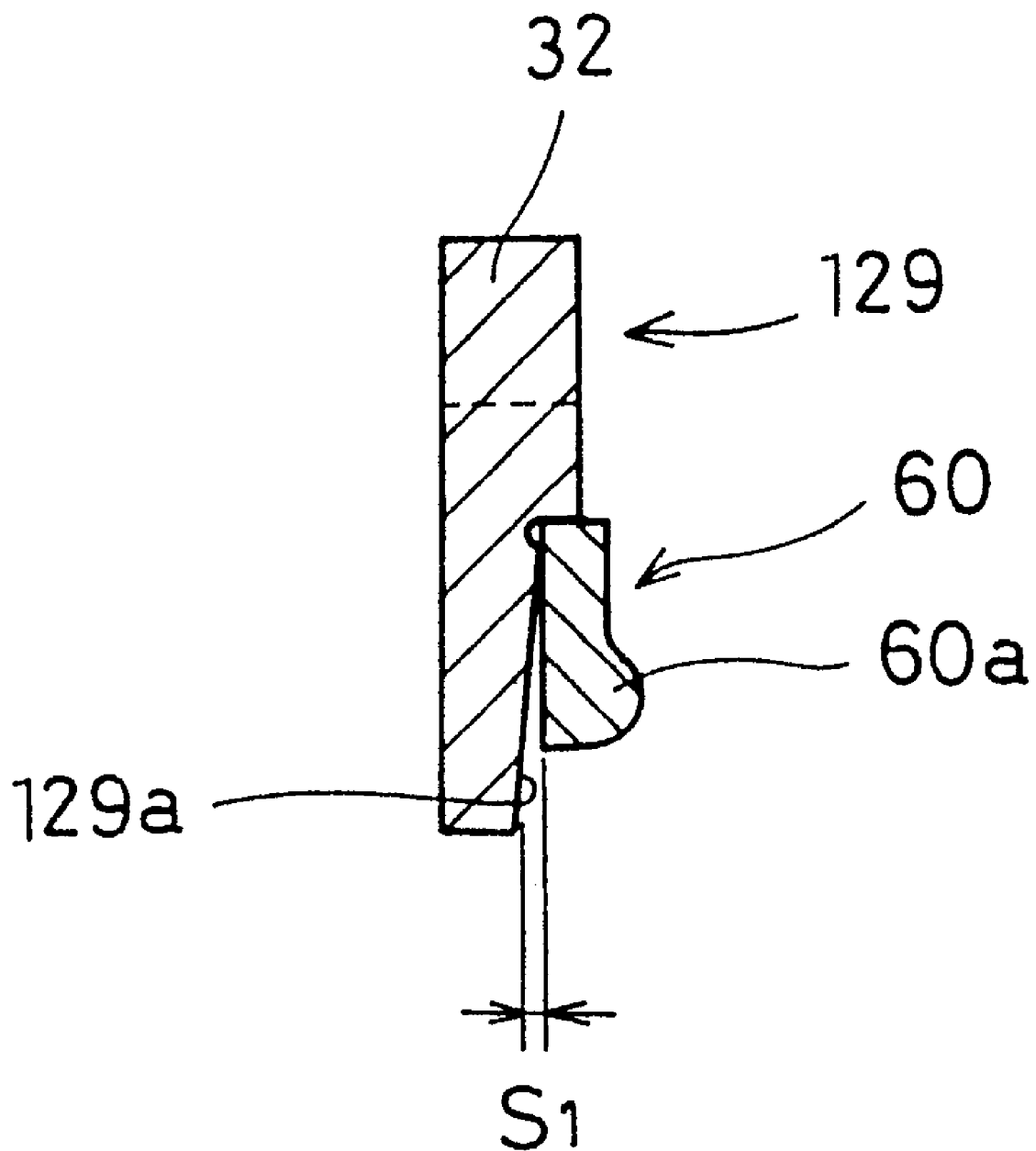
FIG. 11 is a cross-sectional view showing one of the support members and the fulcrum ring removed from the pressure plate and the dry type multi-plate clutch depicted in FIG. 9.

As shown in more detail in FIG. 11, a cushion ring 60 is disposed on the back surface side of the pressure plate 129. The outer circumferential portion of the cushion ring 60 is in contact with the taper surface 129a. With the clutch in a disengaged state, the inner circumferential portion of the cushion ring 60 has a gap $S_1$ between it and the taper surface 129a. The gap $S_1$ serves as a warpage allowance. An annular raised portion 60a having a semi-circular cross-section is formed on the cushion ring 60 on the inner circumferential clutch cover 28 side.

The diaphragm spring 30 is formed of two overlapping disc-like members. The diaphragm spring 30 is further formed of an annular elastic or resilient portion 30a and a plurality lever portions 30b extending radially inwardly from the inner circumference of the annular resilient portion 30a.

The support mechanism 31 is generally the same as described above with respect to the first embodiment. As described above, the annular support members 35 and 36 are fixed to the clutch cover 28 by the plurality of bolts 37. The outer circumferential portion of the annular portion 30a of the diaphragm spring 30 supported by the annular support members 35 and 36 are in contact with the raised portion 60a of the cusion ring 60 to thereby urge the pressure plate 129 toward the flywheel 2.

When a clutch engagement/dis-engagement mechanism, or release unit (not shown) engages the ends of the lever portions 30b of the diaphragm spring 30 and pushes them toward the flywheel 2, the outer circumference of the annular portion 30 of the diaphragm spring 30 is separated away from the pressure plate 129. As a result, the clutch is dis-engaged.

Figure 12:
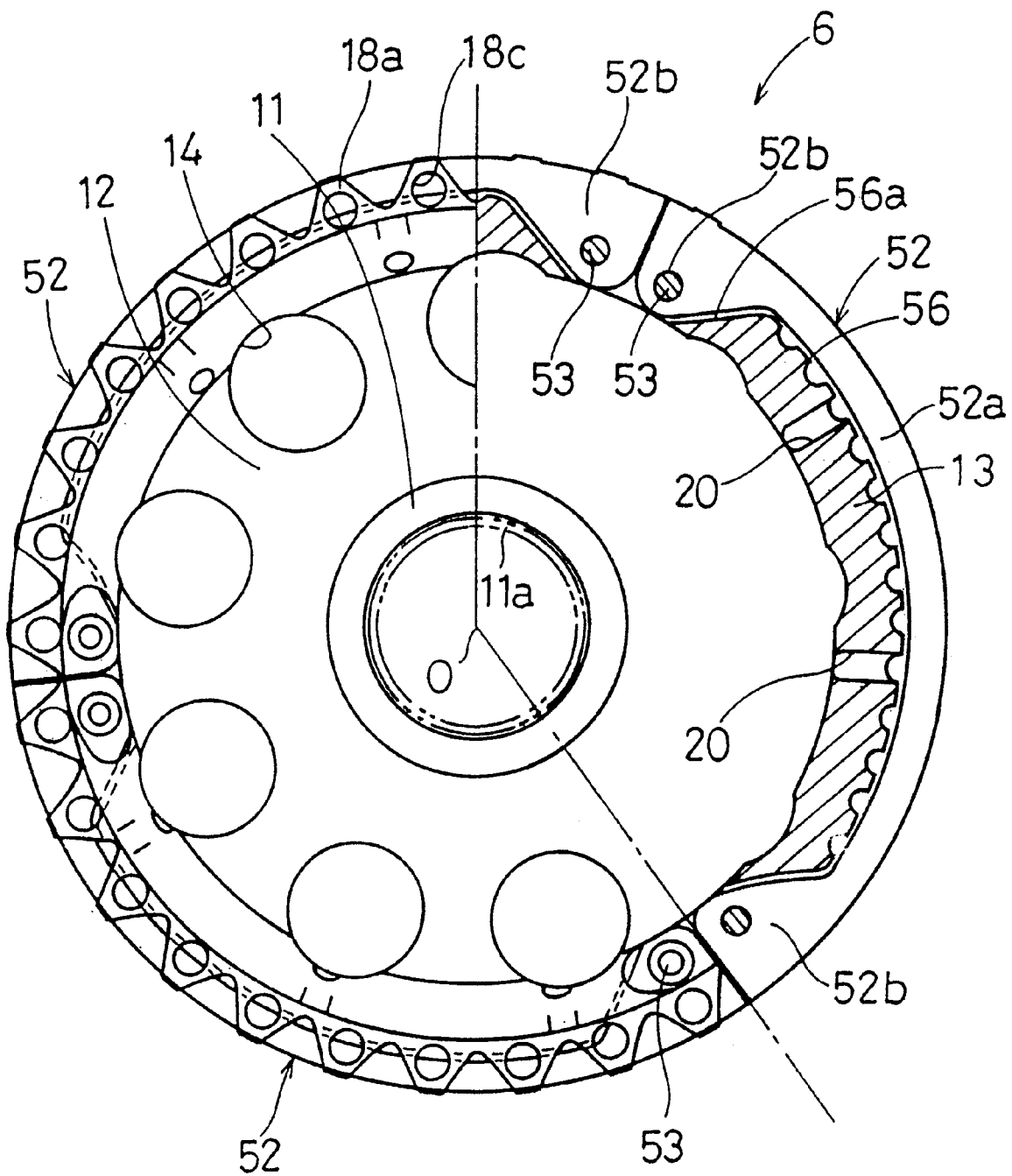
FIG. 12 is a part cross section, part elevational view of a hub flange shown removed from the dry multi-plate clutch depicted in FIGS. 9 and 10.

In the above-described structure, the hub flange 6 is movable in the axial direction relative to the input of the transmission. Accordingly, it is necessary to limit the axial movement of the hub flange 6. For this reason, as shown in FIG. 12, three arcuate plates 52 are connected to the second cylindrical portion 13 of the hub flange 6. The structure of the arcuate plates and the method for mounting them will now be described.

A circumferencial groove 56 is formed on the flywheel 2 side of the outer teeth 18a of the second cylindrical portion 13. The circumferencial groove 56 has a depth close to the bottom portions of the outer teeth 18a. Three receiving portions 56a which extend radially inwardly and pass through the second cylindrical portion 13 are formed at an equal interval in the circumferencial direction in the circumferencial groove 56. The circumferential width of the receiving portions 56a decreases going from the radially outward side to the radially inward side, as is shown in FIG. 12. Each arcuate plate 52 has an arcuate portion 52a and fastening portions 52b its both ends. Each fastening portion 52b extends radially inwardly and has a bolt insertion hole. Each arcuate plate 52 is fitted in the circumferential groove 56. Each fastening portion 52b is inserted into the receiving portion 56a together with the adjacent fastening portion 52b. Each fastening portion 52a is fixed to the second cylindrical portion 13 by bolts 53. Thus, the arcuate portions 52a of the arcuate plates 52 are disposed between the projections 27 of two of the second driven plates 8.

The above-described flywheel 2 and the pressure plate 129 are used to limit the axial movement of the drive plates 7 and the driven plates 8. Thus, the plurality of arcuate plates 52 located between the projections 27 of the two driven plates 8 limited the axial movement of the hub flange 6.

The operation will now be described.

When the pressure applied to the diaphragm 30 toward the flywheel 2 is released by the release unit (not shown), the annular resilient portion 30a of the diaphragm spring 30 urges the cushion ring 60 toward the flywheel 2. The cushion ring 60 is flexed and deformed so that the inner circumferential portion thereof finally comes into contact with the taper surface 129a of the pressure plate 129. Then, the pressure plate 129 is pushed against the frictional plate group 9 so that the drive plates 7 and the driven plates 8 are pressed against each other. As a result, the torque that has been inputted from the flywheel 2 to the flywheel ring 5 is transmitted to the hub flange 6 through the drive plates 7 and the driven plates 8 and further outputted to the input shaft of the transmission. As described above, the cushion ring 60 is flexed and deformed to thereby obtain a cushion effect. As a result, a shock generated upon the clutch engagement is reduced.

When the clutch is dis-engaged, the ends of the lever portions 30b are pushed toward the flywheel 2 by the release unit (not shown) so that the outer circumferetial portion of the annular resilient portion 30a is moved in a direction away from the pressure plate 129. Thus, the pressure against the drive plates 7 and the driven plates 8 is released and the clutch is disengaged. In the release operation described above, the cushion ring 60 tends to take the original position to thereby urges the diaphragm spring 30 in the direction away from the pressure plate 129. Therefore, the force necessary to dis-engage the clutch is maintained at a low level so that the semi-clutch operation becomes less difficult for an operator.

The hub flange 6 is engaged with the drive plates 7 and the driven plates 8 by the three arcuate plates 52 and positioned in the axial direction. In other words, the arcuate plates 52 are contacted with the projections 27 of the two driven plates 8 in the axial direction.

In the above-described structure, the annular portion composed of the three arcuate plates 52 are brought into contact with the projections 27 of the driven plates 8 over the entire circumference. Namely, the area to be contacted with the projections 27 are larger than that of the prior art. For this reason, the contact surface pressure on the projections 27 is reduced, in comparison to prior art configurations and the projections 27 of the driven plates 8 are less likely to become worn.

Each arcuate plate 52 may readily be attached to detached from the circumferential groove 56 of the second cylindrical portion 13. Also, as is apparent from FIG. 12, fastened portions 52b of the respective arcuate plate 52 are not overlapped in the axial direction but are individually fixed to the second cylindrical portion. For this reason, it is not necessary to thin a thickness of the fasten portions 52b. The thickness of the arcuate portions 52a is the same as that of the fastened portions 52b. As a result, the mechanical strength of the fastened portions 52 is enhanced.

Means for fastening the arcuate plates 52 may be any other means in addition to the bolts. The number of the arcuate plate 52 is not limited to three.

FOURTH EMBODIMENT

Figure 13:
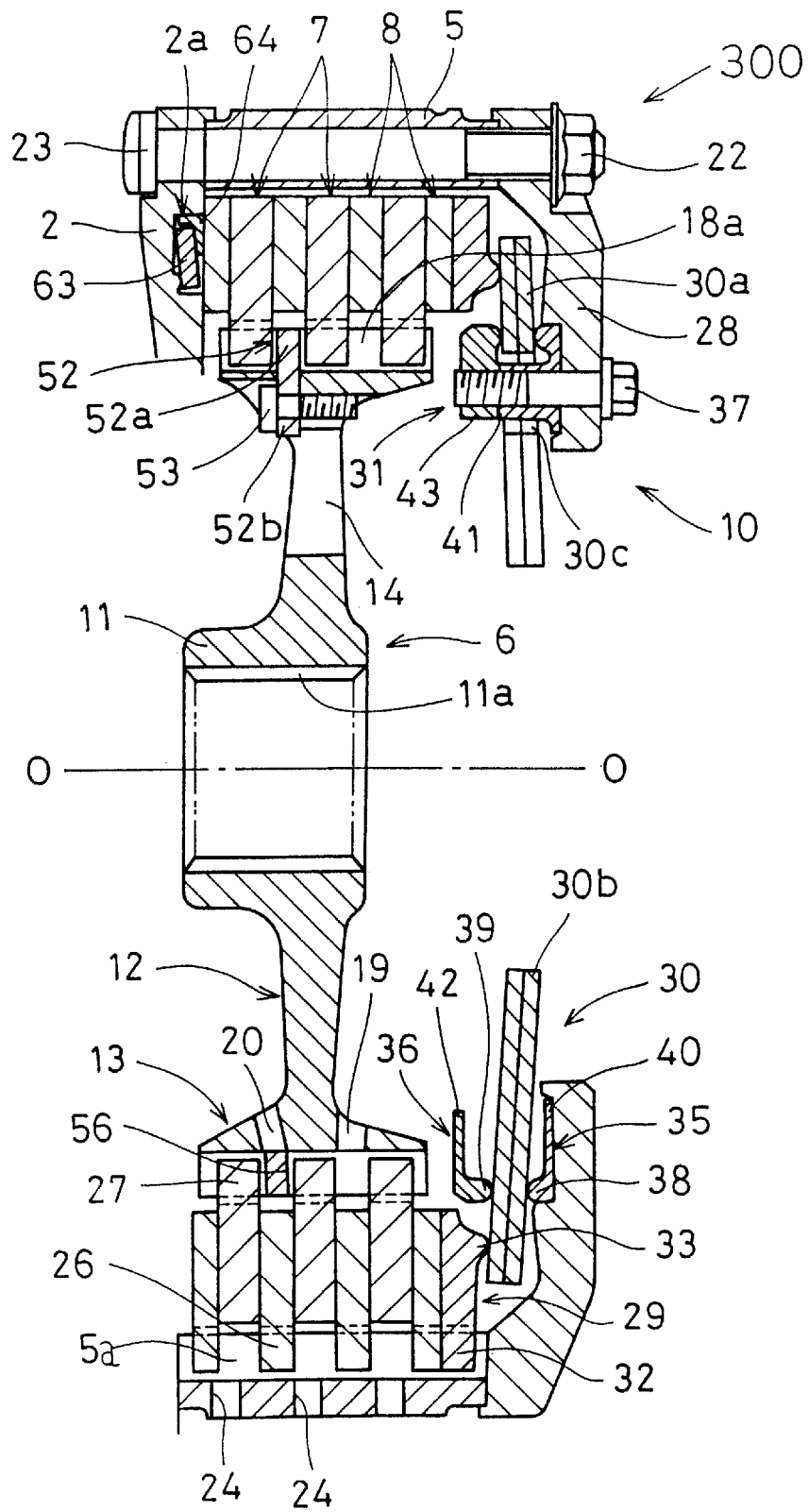
FIG. 13 is a cross-sectional view showing an automotive dry type multi-plate clutch in accordance with a fourth embodiment of the present invention, having a cushioning ring and a piston plate within a flywheel member.
Figure 14:
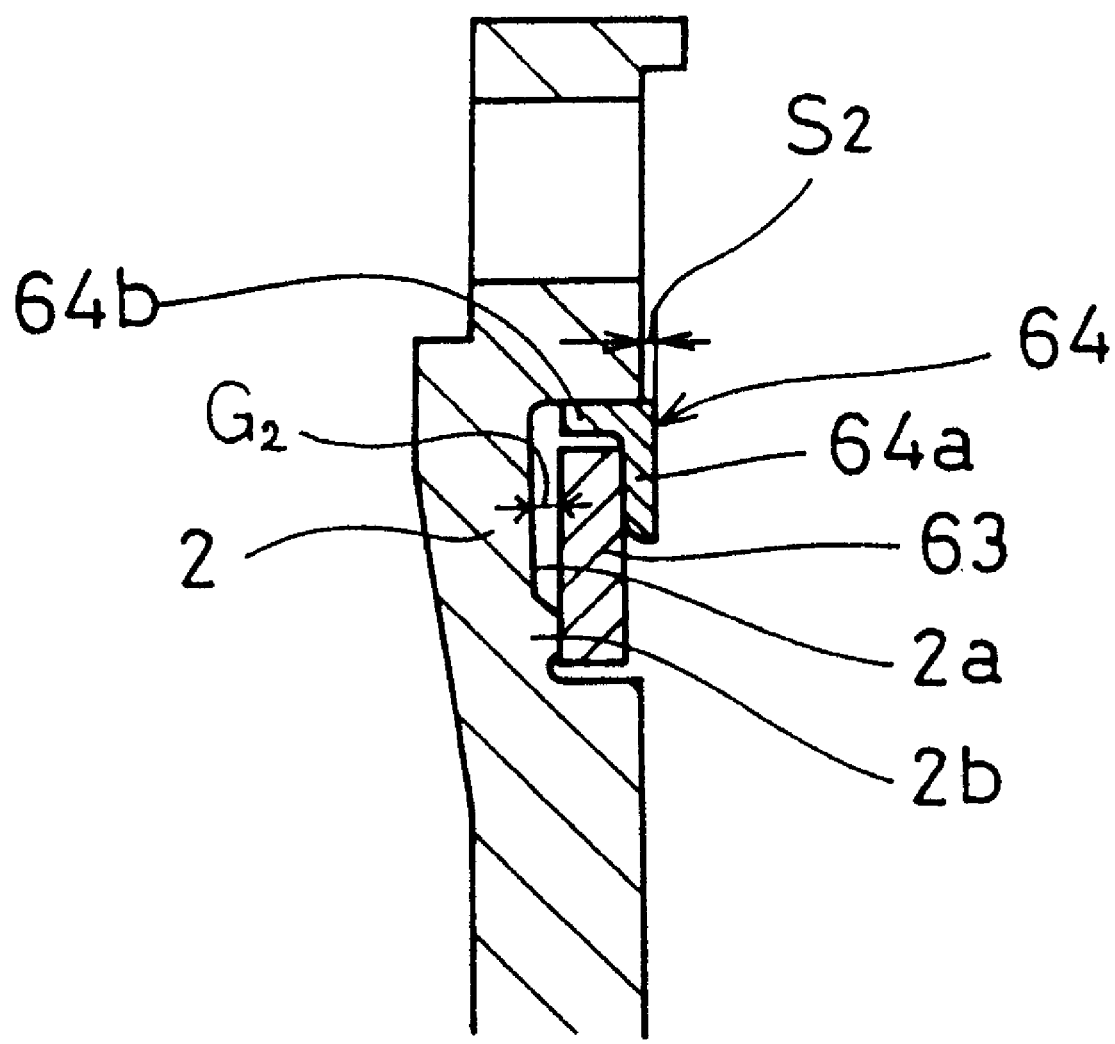
FIG. 14 is a cross-sectional view showing the cushion ring and the piston plate within the flywheel member depicted in FIG. 13, on an enlarged scale, with other parts omitted for clarity.

In a fourth embodiment of the present invention depicted in FIGS. 13 and 14, a dry type multi-plate clutch 300 includes a pressure plate 29 having a raised portion 33 that has a semicircular cross sectionon.

A circularly extending annular groove 2a is formed in the frictional surface of the rotational flywheel 2. A cushion ring 63 and a piston plate 64 are disposed within the groove 2a.

The cushion ring 63 and the piston plate 64 within the groove 2a will now be described with reference to FIG. 14. A raised portion 2b is formed on the inner circumferential side on the bottom of the groove 2a. The inner circumferential portion of the cushion ring 63 is in contact with the raised portion 2b. A gap $G_1$ is defined between the outer circumferential portion of the cushion ring 63 and the bottom portion of the groove 2a with the clutch in a dis-engaged state, as indicated in FIG. 14. The piston plate 64 is composed of a disc portion 64a and a cylindrical portion 64b extending from the inner circumferential side of the disc portion 64a to the engine side. The disc portion 64a is in contact with the inner circumferential portion of the cushion ring 63 on the transmission side. Also, in the clutch dis-engaged state, the disc portion 64a extends from the frictional surface of the rotational flywheel 2 toward the transmission by a distance $S_2$ and is able to contact the adjacent drive plate. The distance $S_2$ generally corresponds to the amount of deformation for the cushion ring 63 once the clutch is put into a clutch engaged state. The outer circumferential surface of the cylindrical portion 64b contacts the outer circumferential surface of the groove 2a slidably in the axial direction.

The operation will now be described.

When the clutch 300 is to be put into a clutch engaged state, pressure applied to the diaphragm spring 30 moving it toward the flywheel 2 is released by movement of the released unit (not shown) away from the flywheel 2. As a result, the outer circumferential portion of the annular resilient portion 30a of the diaphragm spring 30 urges the pressure plate 29 toward the flywheel 2. Then, the annular frictional plate group 9 is moved toward the flywheel 2 to thereby push the piston plate 64. Then, the piston plate 64 is moved by the distance $S_2$ while flexing and deforming the cushion ring 63. Thus, the drive plates 7 and the driven plates 8 are brought into pressing contact with each other. As a result, torque inputted from the flywheel 2 to the flywheel ring 5 is transmitted to the hub flange 6 through the drive plates 7 and the driven plates 8 and further outputted to the input shaft of the transmission. As described above, the cushion ring 63 is flexed and deformed to thereby obtain a cushion effect. As a result, a shock generated upon the clutch engagement is reduced.

When torque transmission through the clutch 300 is to be interrupted or disengaged, the ends of the lever portions 30b are pushed toward the flywheel 2 by the release unit (not shown) so that the outer circumferetial portion of the annular resilient portion 30a is moved in a direction away from the pressure plate 29. Thus, the pressure of the drive plates 7 and the driven plates 8 is released and the clutch is interrupted. In the release operation described above, the cushion ring 63 tends to take is original position (FIG. 14) to thereby urge the annular frictional plate group 9 and the pressure plate 29 in a direction away from the flywheel 2. Therefore, the necessary release force is maintained at a low level so that the clutch engagement and dis-engagement operations becomes easier.

In the multi-plate clutch according to the invention, the resilient member is flexed in the axial direction during the clutch engagement to thereby obtain the cushion effect. Upon the release operation, the load from the resilient member is effected in the clutch release direction to thereby reduce the release load. As a result, the operationability of the semi-clutch operation is enhanced.

Further, as in the above embodiments, axial movement of the hub flange 6 is limited by the arcuate plates 52.

FIFTH EMBODIMENT

Figure 15:
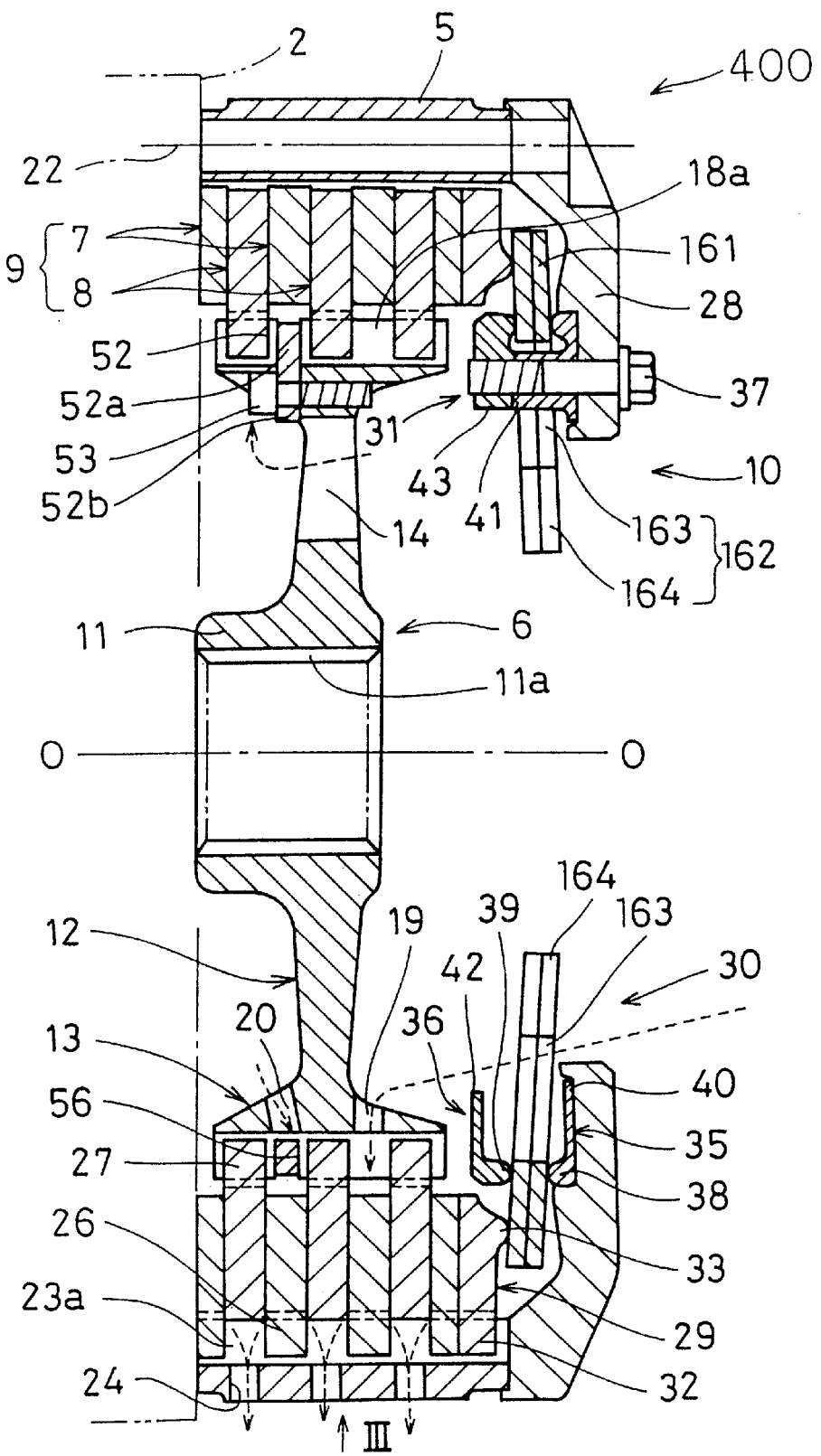
FIG. 15 is a cross-sectional side view, similar to FIGS. 1, 7, 9 and 13, showing an automotive dry type multi-plate clutch in accordance with a fifth embodiment of the present invention having a diaphragm spring.

FIG. 15 is a cross-sectional view showing an automotive dry type multi-plate clutch 400 in accordance with one embodiment of the invention. The line O—O is a rotary axis of the dry type multi-plate clutch 1.

Figure 16:
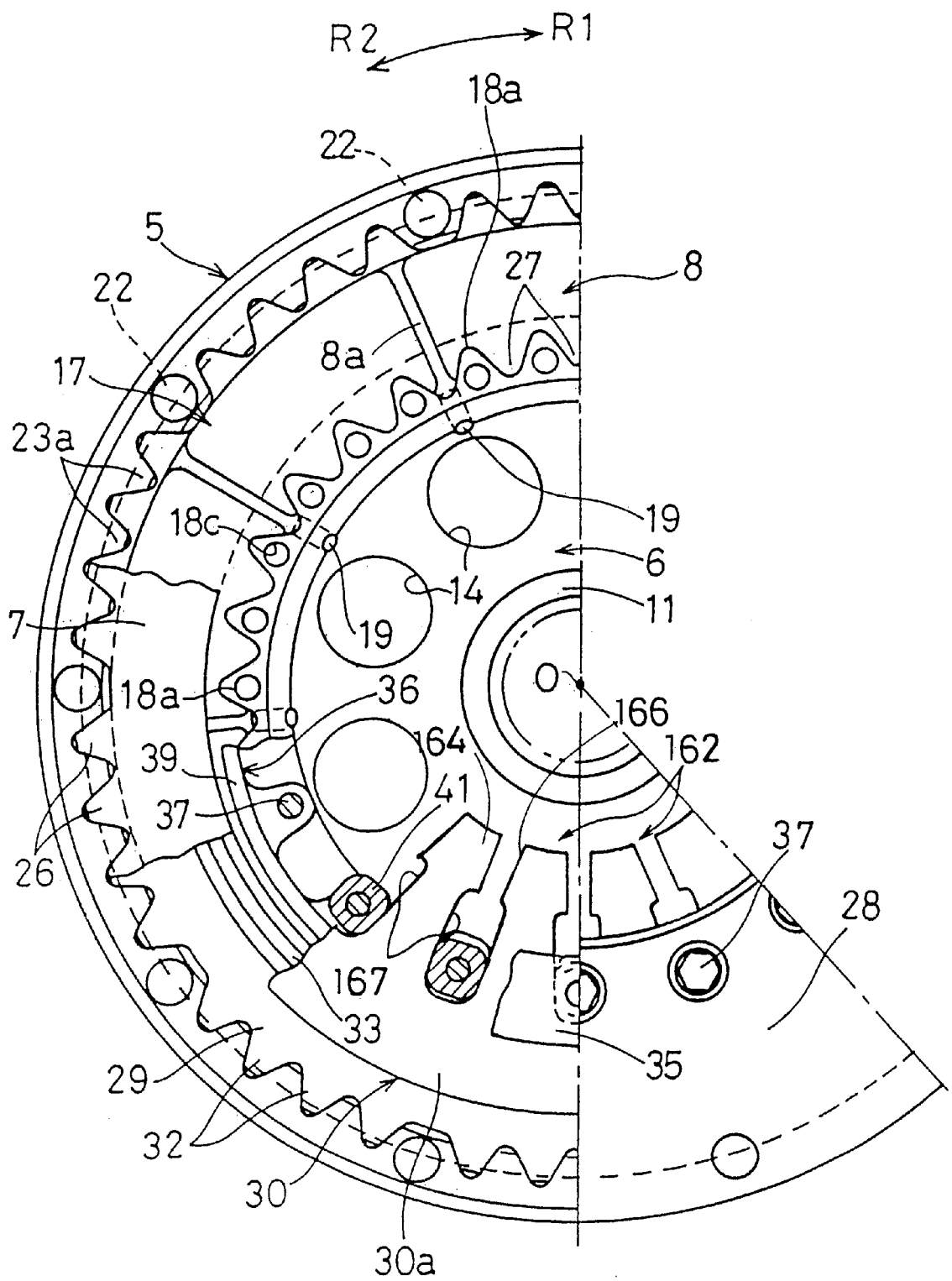
FIG. 16 is a fragmentary, part cross-section, part elevational view of the multi-plate clutch shown in FIG. 15.
Figure 17:
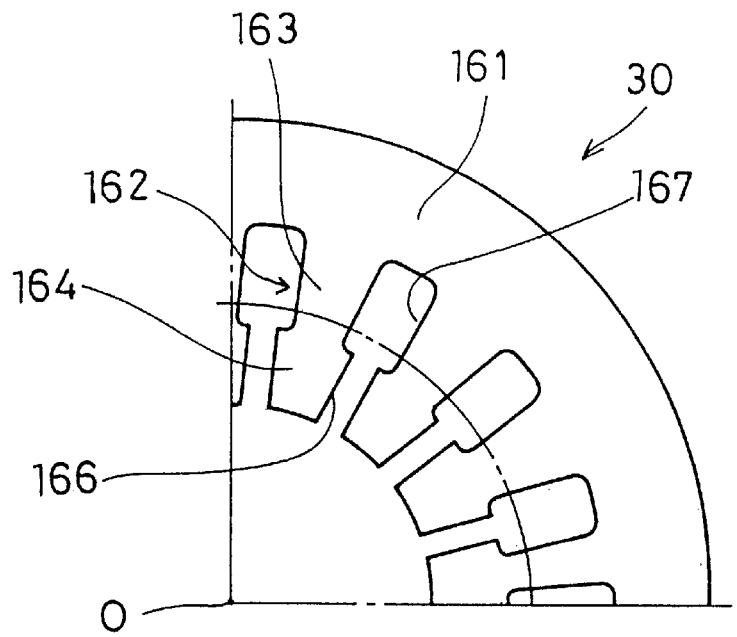
FIG. 17 is a fragmentary end view showing a portion of the diaphragm spring in accordance with the fifth embodiment, shown removed from the clutch depicted in FIGS. 15 and 16.

The dry type multi-plate clutch 400 has many features in common with the first, second, third and fourth embodiments described above. The dry type multi-plate clutch 400 is shown in FIGS. 15, 16 and 17. However, due to the common features in the various embodiments, several figures depicting the above described embodiments also show features of the fifth embodiment. For instance, the arrow III in FIG. 15 corresponds to FIG. 3, which is directed to the first embodiment. The features shown in FIG. 3 also accurately show features of the fifth embodiment. Likewise, FIG. 12 also accurately shows features of the fifth embodiment.

The flange 12 in accordance with the firth embodiment is provided with a plurality of circular air ventilation openings 14 at an interval in the circumferential direction. A plurality of air ventilation holes 19 and 20 are provided in portions on both sides in the axial direction of the second cylindrical portion 13. The air ventilation holes 19 and 20 (shown in FIGS. 12 and 15) are formed to pass substantially in the radial direction through the second cylindrical portion 13 and are opened to bottom portions between the outer teeth 18a at their radially outward ends.

Figure 3:
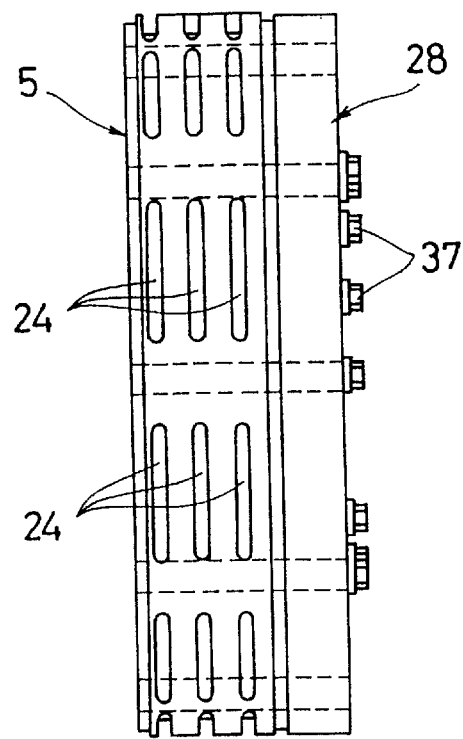
FIG. 3 is a side elevational view showing the dry type multi-plate clutch.

A flywheel ring 5 is coaxially arranged radially outwardly of the second cylindrical portion 13. A plurality of air passage slots 24 are provided at a plurality (for example, three) of locations at an interval in the axial direction on the outer circumference of the flywheel ring 5. As shown in FIGS. 15 and 3, the air passage slots 24 are provided radially outwardly of the driven plates 8. Each air passage slot 24 extends arcuately along the circumferential direction of the flywheel ring 5 with its bottom opening to the bottom surface of the plurality of internal teeth 23a. Due to the fact that the air passage slots 24 extend in the circumferential directions, the weight of the flywheel ring 5 is reduced.

As shown in FIG. 16, a plurality of radial grooves 8a formed at an equal interval in the circumferential direction are provided in the surface of the driven plates 8. The grooves 8a corresponds to the air passages 19 and 20 formed in the second cylindrical portion 13.

The diaphragm spring 30 is made of overlapped two disc-like members. The diaphragm spring 30 is composed of an annular elastic or resilient portion 161 and a plurality lever portions 162 extending radially inwardly from the inner circumference of the annular resilient portion 161. The lever portions 162 are provided at an equal interval in the circumferential direction. Each of the lever portions 162 is composed of a body portion 163 connected to the annular resilient portion 161 and a release unit contact portion 164 at its end.

A shape of lever portions 162 will now be described in detail with reference to FIG. 17. The contact portions 164 have a larger width (length in the circumferential direction) than that of the body portions 163. Also, the body portions 163 are radially longer than the contact portions 164. Namely, seeing the shape of the slit formed between the adjacent two lever portions 162, it takes an inner circumferential slit 166 between the contact portions 164 and an outer circumferential slit 167 (oblong hole) between the body portions 163. The outer circumferential slit 167 (oblong hole) is larger in width in the circumferential direction and radially long than the inner circumferential slit 166. Thus, since the outer circumferential slit 167 (oblong hole) is formed to be longer in the circumferential direction, the amount of air flowing through both sides of the diaphragm spring 30 is increased.

The support mechanism 31 includes a pair of first and second support members 35 and 36 for supporting the inner circumferential portion of the annular portion 30a of the diaphragm spring 30

The operation will now be described.

When the clutch 400 is engaged, a release unit (not shown) does not the contact portion 164 of the lever portion 162 of the diaphragm spring 30 to push the lever portion 162 toward the flywheel 2. Therefore, the elastic or resilient force of the diaphragm spring 30 pushes the pressure plate 29 toward the frictional plate group 9. Thus, the drive plates 7 and the driven plates 8 are pressingly contacted with each other. The torque inputted from the flywheel 2 to the flywheel ring 5 is transmitted through the drive plates 7 and the driven plates 8 to the hub flange 6 and further outputted from the hub flange 6 to the input shaft of the transmission.

When the clutch is to be dis-engaged from transmitting torque, the contact portions 164 of the lever portions 162 of the diaphragm spring 30 are pushed toward the flywheel 2 by the release unit (not shown) so that the outer circumferetial portion of the annular portion 161 of the diaphragm spring 30 is moved in a direction away from the pressure plate 29. Thus, the pressure contact of the drive plates 7 and the driven plates 8 is released and the clutch is interrupted.

Since the outer circumferential slits 167 (oblong holes) are radially elongated in the lever portions 162 of the diaphragm spring 30, the rigidity of the lever portions 162 is lowered. For this reason, it is possible to moderate the response characteristics thereof to thereby enhance the operationability of the semi-clutch action.

A large amount of the air from the transmission side is caused to flow into the multi-plate clutch 1 from the outer circumferential slits 167 (oblong holes) which have a large area. Subsequently, the air is caused to flow through the air passages 19 and 20 formed in the second cylindrical portion 13, by the centrifugal force, and is caused to flow to the outside through the grooves 8a formed in the driven plates 8 and the air passage grooves 24 of the flywheel ring 5. Thus, the drive plates 7 and the driven plates 8 are cooled so that the service life thereof is prolonged. Also, since the temperature within the multi-plate clutch 1 is lowered, the degradation of each part may be suppressed.

In the above-described structure, the annular portion composed of the three arcuate plates 52 are brought into contact with the projections 27 of the driven plates 8 over the entire circumference. Namely, the area to be contacted with the projections 27 are larger than that of the prior art. For this reason, the surface pressure to the projections 27 is lowered and the projections 27 of the driven plates 8 experience less wear.

Each arcuate plate 52 may readily be attached to detached from the circumferential groove 56 of the second cylindrical portion 13. Also, as is apparent from FIG. 12, fastened portions 52b of the respective arcuate plate 52 are not overlapped in the axial direction but are individually fixed to the second cylindrical portion. For this reason, it is not necessary to thin a thickness of the fasten portions 52b. The thickness of the arcuate portions 52a is the same as that of the fastened portions 52b. As a result, the mechanical strength of the fastened portions 52 is enhanced.

SIXTH EMBODIMENT

Figure 18:
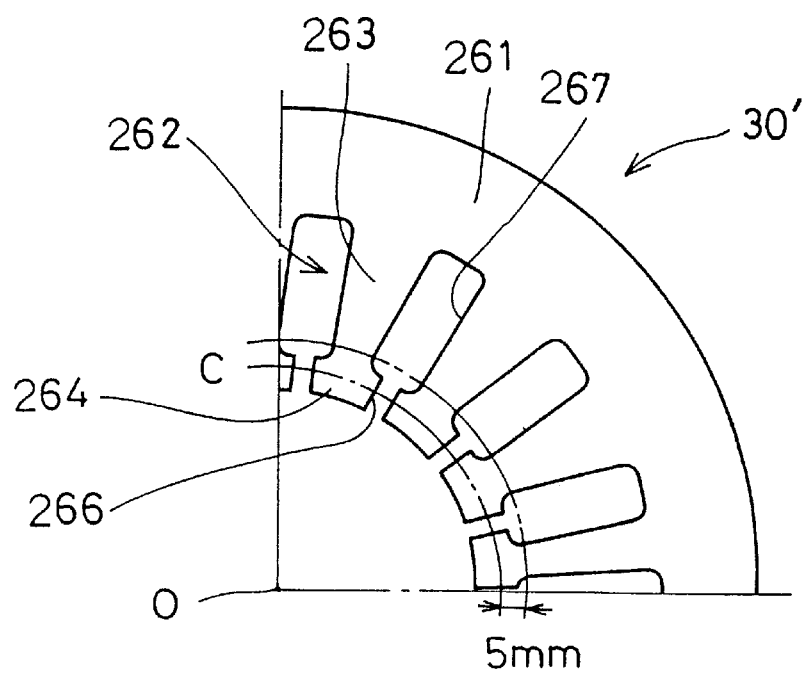
FIG. 18 a fragmentary end view showing a portion of a diaphragm spring similar to that depicted in FIG. 17 in accordance with a sixth embodiment of the present invention.

As shown in FIG. 18, the diaphragm spring 30' may have similar features to that of the diaphragm spring 30 shown in FIG. 17. However, in the diaphragm spring 30' the radial length of the body portions 263 may be two-thirds or more of the radial length of the contact portions 264. Namely, the radial length of the outer circumferential slits 267 is two-thirds or more of the radial length of the inner circumferential slits 266. In this case, the amount of the air flow through the diaphragm spring 30' is larger than that in case of the foregoing embodiment. Incidentally, the contact portions 264 are formed in a range of 5 mm or less on the radially outwardly from the portion C to which the release unit is generally to be contacted. For this reason, even if the contact portion of the release unit is moved radially outwardly during the release operation, the contact portions 264 are brought into firm contact with the release unit.

According to the present invention, since the amount of the air flowing through the diaphragm spring is increased, the cooling effect of the clutch is enhanced.

SEVENTH EMBODIMENT

Figure 19:
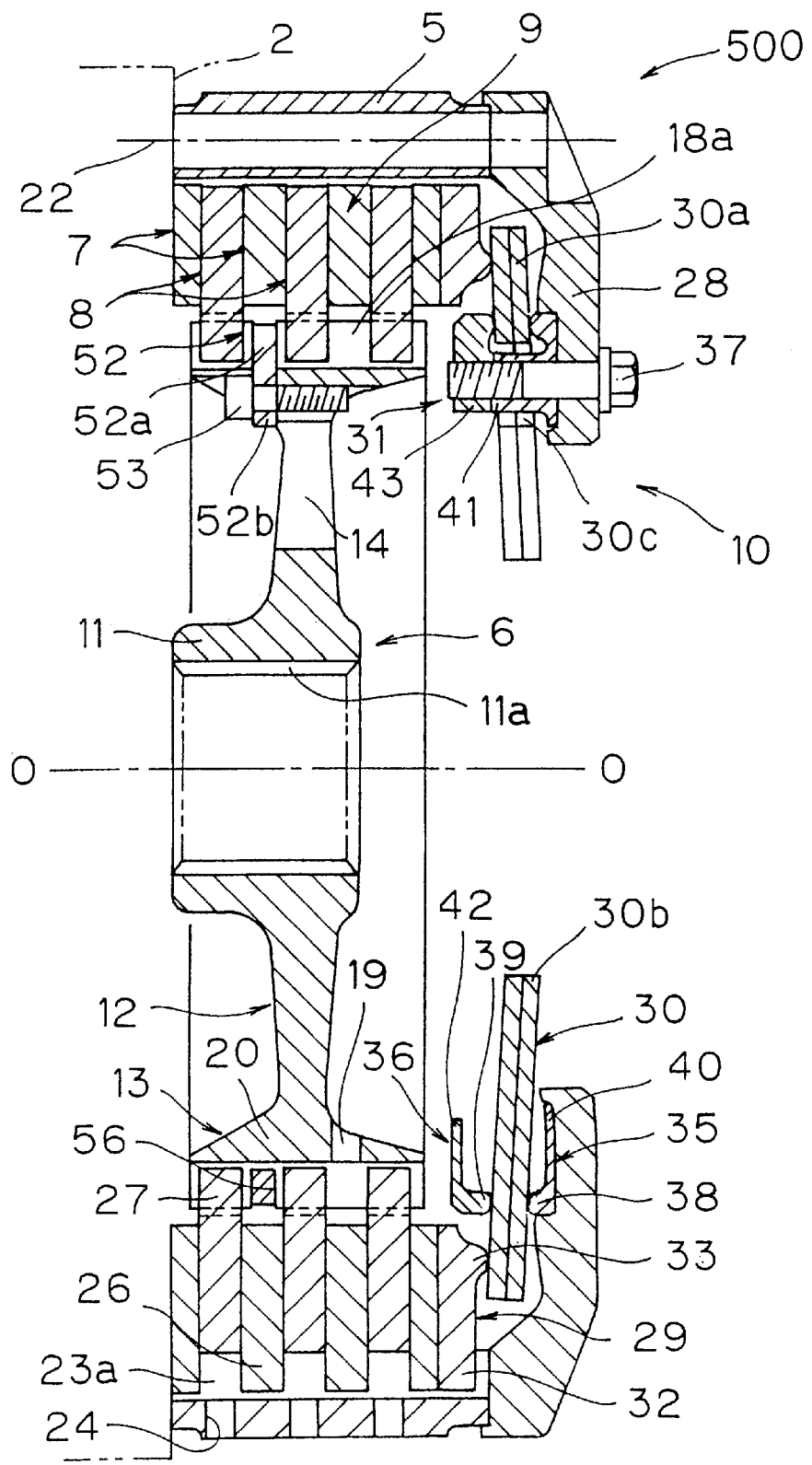
FIG. 19 is a cross-sectional view showing an automotive dry type multi-plate clutch in accordance with a seventh embodiment of the present invention.

FIG. 19 is a cross-sectional view showing an automotive dry type multi-plate clutch 500 in accordance with a seventh embodiment of the present invention. The line O—O is a rotary axis of the dry type multi-plate clutch 500.

Figure 20:
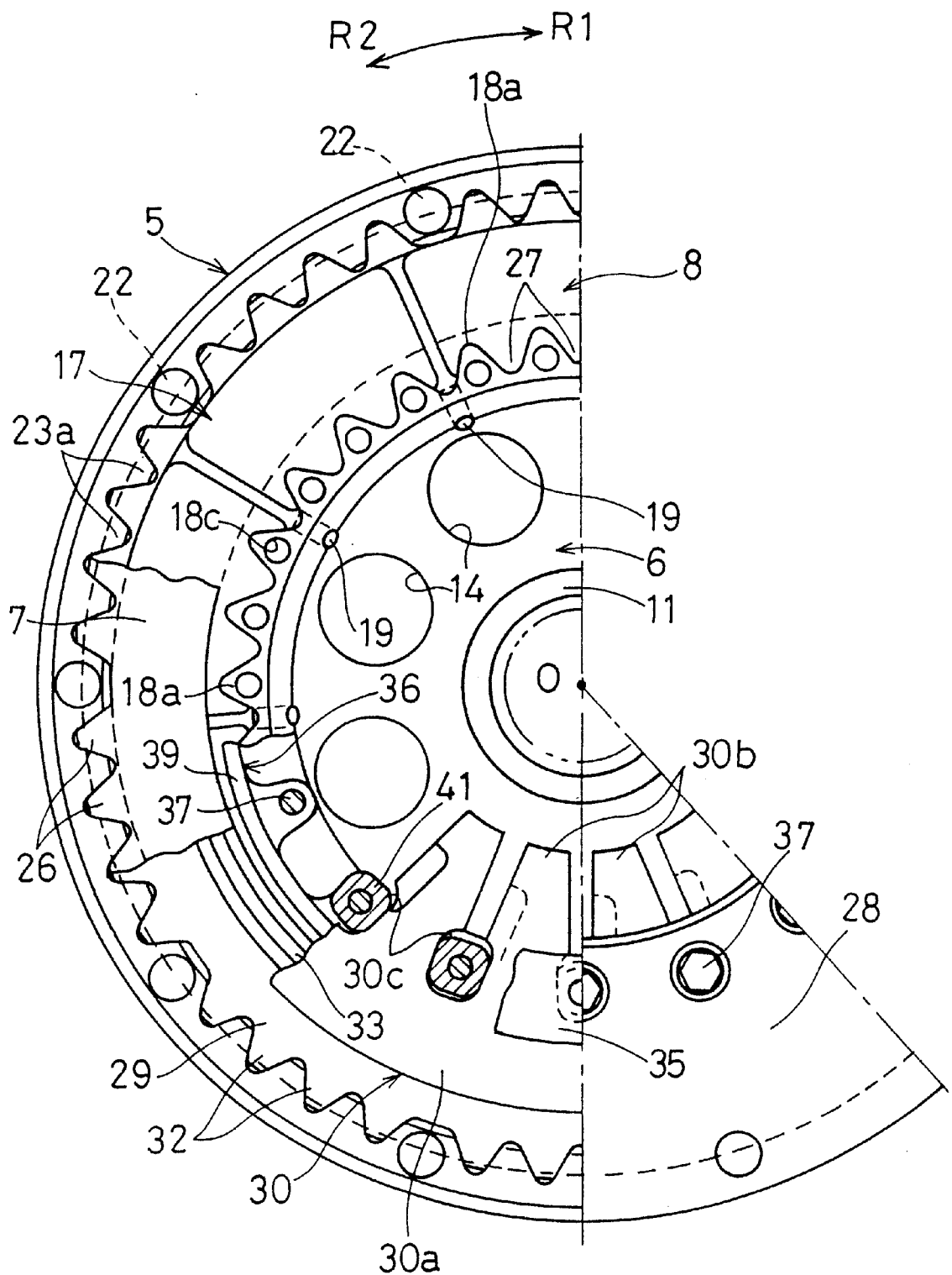
FIG. 20 is a fragmentary, part cutaway, part elevation and part cross sectional view of the multi-plate clutch depicted in FIG. 19.

The dry type multi-plate clutch 500 is shown in FIGS. 19 and 20. Additionally, FIG. 12 also shows the specific features of the seventh embodiment.

In the seventh embodiment, many of the features are similar or the same as described with the above described embodiments. The clutch cover assembly 10 includes a clutch cover 28, an annular pressure plate 29 arranged within the clutch cover 28, a biasing means 30 for urging the pressure plate 29 toward the flywheel 2, and a support mechanism for supporting the biasing means 30 to the clutch cover 28.

The biasing means 30 is composed of overlapped first diaphragm spring 30A and second diaphragm spring 30B. Both diaphragm springs 30A and 30B are composed of an annular portion 30a and a plurality of lever portions 30b extending radially inwardly from the inner circumference of the annular portion 30a. The lever portions 30b are provided at an equal interval in the circumferential direction. A slit is formed between the adjacent lever portions 30b. A cutaway 30c having a relatively large width in the circumferential direction is formed in a radially outward portion of each slit. Both sides of the first diaphragm spring 30A and the second diaphragm spring 30B are subjected to solid lubricant film coating. The rust proof and lubricant effects are ensured by the solid lubricant film. It is preferable to use a fluorine resin as a material for the solid lubricant film. Of course, any other solid lubricant may be used.

The film coating of fluorine resin is formed on surfaces of the first and second diaphragm springs 30A and 30B in the following steps. First of all, the first and second diaphragm springs 30A and 30B are subjected to degreasing, rust-proof treatment, chemical coating and drying. Subsequently, in any one of methods of spraying, dipping, and brush-coating, the fluorine resin coating is formed on the surface of the first and second diaphragm springs 30A and 30B. Finally, heat curing is effected thereto.

The release unit (not shown) is arranged close to the inner circumferential portion of the first and second diaphragm springs 30A and 30B. When the release unit pushes the ends of the lever portions 30b of the first and second diaphragm springs 30A and 30B toward the flywheel 2, the outer circumference of the annular portion 30a of the first and second diaphragm springs 30A and 30B is separated away from the pressure plate 29. As a result, the clutch engagement is released.

In the above-described structure, the hub flange 6 is movable in the axial direction relative to the input of the transmission. Accordingly, it is necessary to limit the axial movement of the hub flange 6. For this reason, as shown in FIGS. 12 and 19, three arcuate plates 52 are connected to the second cylindrical portion 13 of the hub flange 6.

The operation will now be described.

In the clutch engaged state, the release unit (not shown) does not push the first and second diaphragm springs 30A and 30B toward the flywheel 2, but the elastic or resilient force of the first and second diaphragm springs 30A and 30B pushes the pressure plate 29 toward the frictional plate group 9. In this case, a large force is exerted by the two first and second diaphragm springs 30A and 30B. Thus, the drive plates 7 and the driven plates 8 are urged into contact with each other. The torque inputted from the flywheel 2 to the flywheel ring 5 is transmitted through the drive plates 7 and the driven plates 8 to the hub flange 6 and further outputted from the hub flange 6 to the input shaft of the transmission. Since force is obtained by using the two first and second diaphragm springs 30A and 30B, the torque transmission capacity of the clutch 500 is increased, as compared to prior art configurations.

In case where interruption of torque transmission is to be effected to put the clutch into a dis-engaged state, the release unit (not shown) pushes the ends of the lever portions 30b of the first and second diaphragm springs 30A and 30B toward the flywheel 2, and urges the outer circumferential portion of the annular portion 30a of the first and second diaphragm springs 30A and 30B in a direction away from the pressure plate 29. Thus, the force exerted on the drive plates 7 and the driven plates 8 is released and the clutch 500 is dis-engaged.

Since the solid lubricant film is formed in the interface of the two first and second diaphragm springs 30A and 30B constitutes the biasing means 30, friction is generated between the two components is very low or negligable. For this reason, the operational efficiency of the biasing means 30 is enhanced.

Also, since the surfaces, opposite the interface, of the two of first and second diaphragm springs 30A and 30B are subjected to the formation of the solid lubricant film, wear reduing properties are enhanced in the support portions 38 and 39, the raised portion 33 of the pressure plate 29 and the release unit (not shown).

Furthermore, since both surfaces of each of the first diaphragm spring 30A and the second diaphragm spring 30B are subjected to the solid lubricant film, it is unnecessary to pay any special attention to the surfaces thereof during assembling. As a result, the assembling operationability is enhanced.

In the above-described structure, the three arcuate plates 52 contact the projections 27 of the driven plates 8 over the entire circumference thereof. Namely, the contact area of the projections 27 is larger than that of prior art configurations. For this reason, the surface pressure per unit area to the projections 27 is reduced compared to the prior art and possible wear of the projections 27 of the driven plates 8 reduced.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A multi-plate clutch mechanism, comprising:

a first cylindrical portion configured for connection to a flywheel;

a hub flange having a second cylindrical portion disposed concentrically within said first cylindrical portion, said hub flange configured to non-rotatably engage an input shaft of a transmission and to axially slide with respect to the input shaft;

a plurality of first friction plates disposed between said first cylindrical portion and said second cylindrical portion, said first friction plates being circumferentially engaged for rotation with said first cylindrical portion but relatively slidable in the axial direction with respect to said first cylindrical portion;

a plurality of second friction plates disposed alternatingly adjacent to said first friction plates in the axial direction, said second friction plates being formed with gear teeth engaged with corresponding gear teeth formed on said second cylindrical portion such that said plurality of second friction plates roatate with said second cylindrical portion but are configured for limited relative axial movement with respect to said second cylindrical portion, a first one of said second friction plates being formed with at least one contact portion, that extends radially inward defining a diameter smaller that a diameter defined by said gear teeth, said contact portion of said first one of said second friction plates engaging a slot formed in a first axial side of said second cylindrical portion and a second one of said second friction plates being formed with at least one contact portion that extends radially inward defining a diameter smaller that the diameter defined by said gear teeth, said contact portion of said second one of said second friction plates engaging a slot formed in a second axial side of said second cylindrical portion, said first and second ones of said second friction plates thereby limiting axial movement of said hub flange, a third one of said second friction plates being formed with said gear teeth about an entire inner radial periphery thereof, said third one of said second friction plates being disposed between said first and second ones of said second friction plates; and a pressure plate mechanism fixed to said first cylindrical portion such that said friction plates are disposed between said pressure plate mechanism and the flywheel.

2. The multi-plate clutch mechanism according to claim 1, wherein a plurality of said contact portions are formed on said first and second ones of said second friction plates.

* * * * *